INVENTORS
GERARD T. PAUL
RALPH J. BAHNSEN
JULES F. DIRAC
BY Joseph J. Connerton
ATTORNEY Dec. 24, 1963

G. T. PAUL ETAL 3,115,574

HIGH-SPEED MULTIPLIER

Filed Nov. 29, 1961

Dec. 24, 1963     G. T. PAUL ETAL     3,115,574
HIGH-SPEED MULTIPLIER

Filed Nov. 29, 1961     35 Sheets-Sheet 26

| FIG. 7 | FIG.12 | FIG.17 | FIG.21 | FIG.25 |
|---|---|---|---|---|
| FIG. 6 | FIG.11 | FIG.16 | FIG.20 | FIG.24 |

| FIG. 4 | FIG. 5 | FIG.10 | FIG.15 | | |
|---|---|---|---|---|---|

| | FIG. 3 | FIG. 9 | FIG.14 | FIG.19 | FIG.23 |
|---|---|---|---|---|---|
| | FIG. 2 | FIG. 8 | FIG.13 | FIG.18 | FIG.22 |

FIG. 26

Dec. 24, 1963   G. T. PAUL ETAL   3,115,574
HIGH-SPEED MULTIPLIER
Filed Nov. 29, 1961   35 Sheets-Sheet 33
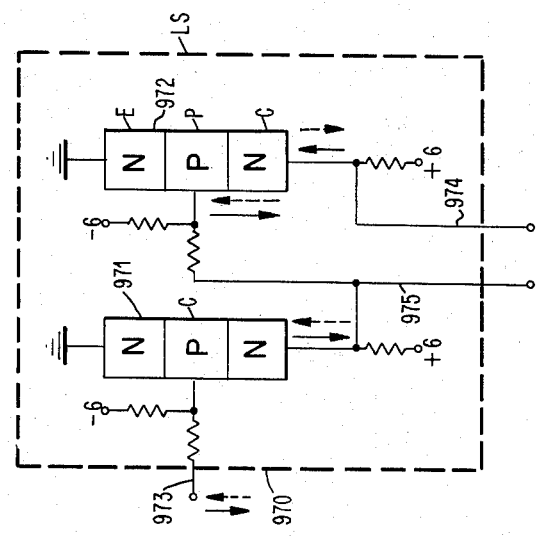
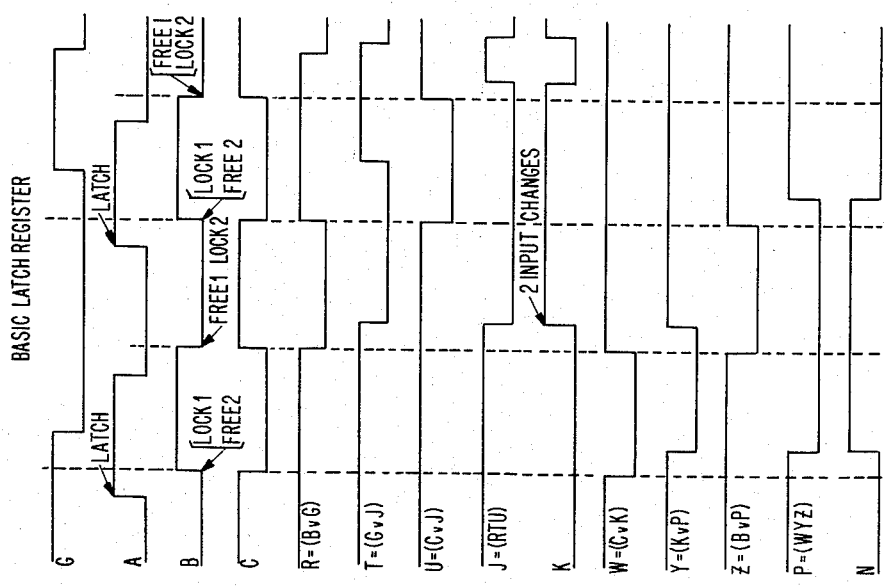

Dec. 24, 1963     G. T. PAUL ETAL     3,115,574

HIGH-SPEED MULTIPLIER

Filed Nov. 29, 1961     35 Sheets-Sheet 34

United States Patent Office 3,115,574
Patented Dec. 24, 1963

3,115,574
HIGH-SPEED MULTIPLIER
Gerard T. Paul, Poughkeepsie, N.Y., Ralph J. Bahnsen, Cambridge, Mass., and Jules F. Dirac, Poughkeepsie, N.Y., assignors to International Business Machines Corporation, New York, N.Y., a corporation of New York
Filed Nov. 29, 1961, Ser. No. 155,773
15 Claims. (Cl. 235—164)

The present invention relates to data processing systems and more particularly to an improved arithmetic element for use in such systems.

The speed at which calculations may be performed in many computing devices is of paramount consideration. In certain types of multipliers, it has been customary to derive a product of two binary numbers by sensing each bit of the multiplier number in sequence and generating a partial product. In such multipliers, if the bit of the multiplier being sensed is a one, the multiplicand is added to an accumulator and shifted one position to the right; if the bit of the multiplier being sensed is a zero, the contents of the accumulator are merely shifted one position to the right. The process of sensing each bit of the multiplier and either adding the multiplicand to the accumulated partial product and shifting or merely shifting the accumulated partial product continues until the last partial product is derived, at which time the product is stored in the accumulator. The calculation speed of multiplying devices of this type has inherent limitations due to the requirement to examine each bit of the word, and a fixed period of time is allotted for generating each partial product regardless of whether the partial product requires both an add and a shift operation or merely requires a shift operation. Thus, the time period allotted for generating each partial product is fixed for the most time-consuming situation, because the clock pulses must be separated in time by an amount sufficient to permit the add plus the shift operation in each case for a given partial product. Higher speed operation has been achieved in other prior art binary devices by employing parallel arithmetic devices wherein calculations are performed on all orders or digits simultaneously. While parallel operation generally permits higher speed operation, this is also limited by the requirement to examine each individual bit. It is important to reduce the time for performing multiply operations in parallel arithmetic devices still further, and it is to this aspect of computing devices to which the present invention is directed.

For the purpose of minimizing the time required to perform a multiply operation, there is provided according to this invention a multiplier arrangement which reduces the total number of addition operations necessary to produce the product by operating on a number of multiplier bits or bytes simultaneously.

In one arrangement according to this invention an improved multiplier is provided which generates partial products for bytes of two or more bits of the multiplier simultaneously instead of generating a partial product for each individual bit of the multiplier.

According to another aspect of this invention, provision is made to employ two or more carry save adders connected in tandem with several partial products determined from different groups of bits of the multiplier going to the various adders whereby a plurality of partial products are generated and accumulated simultaneously. Each carry save adder has two or more positions or stages, each stage having a full adder with three inputs, A, B and C, and a sum and carry output. The carry save adders are interconnected such that the sum outputs of the first carry save adder are coupled to corresponding positions as inputs to the second carry save adder, and the carry outputs of the first carry save adder are coupled as inputs to the second carry save adder shifted one position, the second carry save adder having its outputs connected in like fashion to the third carry save adder and so forth. By simultaneously examining the multiplier bits on a byte basis, the number of operations required to generate the product is substantially reduced and a constant shift can be used both for the multiplier and multiplicand partial product loop. For example, using bytes of 3 bits, if the multiplier contains N bits, the total number of operations required is reduced to $N/3+1$. By using carry save adders, carry propagation time need be allowed only for the final summation rather than allowed for each operating cycle.

In the instant invention, the multiplier bits are divided into groups with each group containing an equal number of bits and a decoder device is provided for each such group of bits. Signals from the multiplier bits are supplied as inputs to the associated decoders and each decoder has output lines on which signals representative of a selected multiple of the multiplicand are generated. One way to operate such a decoder is to provide an output line for each possible multiple of the multiplicand. For example, assuming multiplier groups of three bits each, multiples of 0, 1, 2, . . . 7 could be made available for selection by the decoder. Such an arrangement, however, would involve a great deal of equipment merely to generate and maintain the selected multiples available.

Accordingly, there is provided according to this invention a decoder arrangement which responds to groups of bits from the multiplier and generates only predetermined multiples of the multiplicand, the remaining multiples consisting of various combinations of the predetermined multiples. Multiples employed in the present invention are the 1, 2, 3, 4 and 6, the 1 and 3 multiples being available in either positive (true) or negative (complement) form. The 0 multiple is not required, while the 5 and 7 multiples are combinations of $-3$ and $+8$ and $-1$ and $+8$ multiples respectively. As more fully described in detail hereinafter, the particular multiple selected is in part determined by whether the preceding operation was add or subtract. Each group of multiplier bits when decoded identifies the particular multiplicand multiples combination and the operation to be performed, i.e., add or subtract. While the above described decoding scheme can be applied to multiplier groups having varying number of bits, in practice groups of two or three bits each are preferably employed. The preferred embodiment is described in terms of 3 bit groups which permit faster operation than the two bit group.

For the purposes of illustrating how the foregoing decoding scheme operates, let it be assumed that multiplier groups of three bits each are used and that the multiplier is 110 101 100 011. Treating the multiplier in this fashion the product could be obtained by adding the partial products of 3× multiplicand since this represents the value of the right most octal group, then shift three places to the left and add in 4× multiplicand representing the value of the octal group second from the right, shift three more places to the left and add in 5× multiplicand representing the value of the octal group third from the right and finally shift three more places to the left and add in 6× multiplicand representing the value of the left most octal group. In this case only four addition operations of four partial products are required to generate the final product as contrasted to 16 addition operations required when operating on a single bit basis.

Thus, the present invention provides a decoding scheme which requires fewer multiples. The multiples of 2×, 4× or 8× multiplicand can be derived directly merely by shifting the multiplicand 1, 2 or 3 positions respectively and the multiple of 3× multiplicand may be obtained by adding 2× multiplicand to the multiplicand and making the resultant sum available in a register. The multiple of 6× multiplicand is derived by shifting the 3× multiplicand value one position. By using the multiples of 2, 3, 4 and 6, a group of equalities as set out in Table 1 below may be developed.

*Table 1*

| Multiplier Bits | Multiplicand Multiple Combinations Last Cycle Add | Multiplicand Multiple Combinations Last Cycle Subtract |
| --- | --- | --- |
| 000 | Bypass (+) | Add 1× MCD. |
| 001 | Add 1× MCD | Add 2× MCD. |
| 010 | Add 2× MCD | Add 3× MCD. |
| 011 | Add 3× MCD | Add 4× MCD. |
| 100 | Add 4× MCD | Subtract 3× MCD. |
| 101 | Subtract 3× MCD | Add 6× MCD. |
| 110 | Add 6× MCD | Subtract 1× MCD. |
| 111 | Subtract 1× MCD | Bypass (−). |

The value of 5× MCD is obtained by subtracting 3× MCD and adding 8× MCD in the next cycle, while the value of 7× MCD is obtained by subtracting 1× MCD and then adding 8× MCD on the following cycle. Thus two of the multiples require both an addition and a subtraction operation, the addition in both cases being add 8× MCD on the following cycle. The addition of 8× MCD is accomplished by merely adding one to the lowest order of the octal group immediately to the left of the decoded octal group. Thus considering Table 1 and the variance between the last cycle add and the last cycle subtract column, it is evident that the last cycle add column is identical to the last cycle subtract column plus one.

Accordingly, a primary object of the present invention is to provide an improved multiplier operating simultaneously on a group of multiplier bits.

Another object of the present invention is to provide an improved multiplier which generates a group of partial products simultaneously, each such partial product being derived from a group of multiplier bits.

Another object of the present invention is to provide an improved multiplier wherein groups of multiplier bits are simultaneously decoded to provide the multiplicand multiples used for each partial product.

A further object of the present invention is to provide an improved binary multiplier adapted to generate a plurality of partial products simultaneously, each partial product representing a predetermined multiple of the multiplicand which in turn is derived by decoding a group of multiplier bits.

While the invention has been particularly shown and described with reference to a preferred embodiment thereof, it will be understood by those skilled in the art that various changes in form and details may be made therein without departing from the spirit and scope of the invention.

In the drawings:

FIGS. 2 through 25 illustrate in detail the logic circuits of the multiplier arrangement showing in FIG. 1.

FIG. 26 illustrates the relative arrangement of FIGS. 2 through 25 with respect to one another.

FIG. 32 illustrates the relative arrangement of FIGS. 28 through 31 with respect to one another.

FIG. 35 shows timing diagrams illustrating the operation of a latch register circuit.

FIG. 36 illustrates in schematic form details of the level setter circuits illustrated in block form in FIG. 34.

FIGS. 38 and 39 are charts which help to illustrate the operations which take place in the various parts of the multiplier arrangement illustrated in FIGS. 1 through 25 during a multiply operation.

FIG. 40 illustrates how FIGS. 38 and 39 are arranged with respect to each other.

As heretofore described, the multiplier arrangement according to this invention may use groups of more or less than three bits each, but in the interest of simplicity an arrangement using three bit groups or bytes is illustrated and described. A multiplier of 18 bits and a multiplicand of 8 bits are selected for purposes of illustration, although in practice the benefits of the improved multiplier according to the present invention are more noteworthy as the multiplicand and multiplier become very great in length, say 48 bits each in length, for instance. Positive logic is employed throughout the system unless indicated otherwise. D.C. levels may be employed to operate the logic circuits illustrated, although in some instances the circuits may be operated by pulses which swing toward a positive level and return to a more negative level upon termination. Signal levels representing binary information are positive when representing binary "1" and negative when representing binary "0." Levels are referred to hereinafter as positive and negative levels, but this designation is arbitrarily used since in many instances two positive levels, one being more positive than the other, or two negative levels, one being more negative than the other, may be suitably employed in various types of logic circuits. Throughout the figures of the drawings, arrowheads are employed to indicate the direction of information flow or the direction of control for D.C. or pulse signals, and signals going to a circuit may be shown connected to any portion of the block representation of the circuit. Numerals enclosed within circular portions of cables indicate the number of conductors in the cable.

Figure 1:
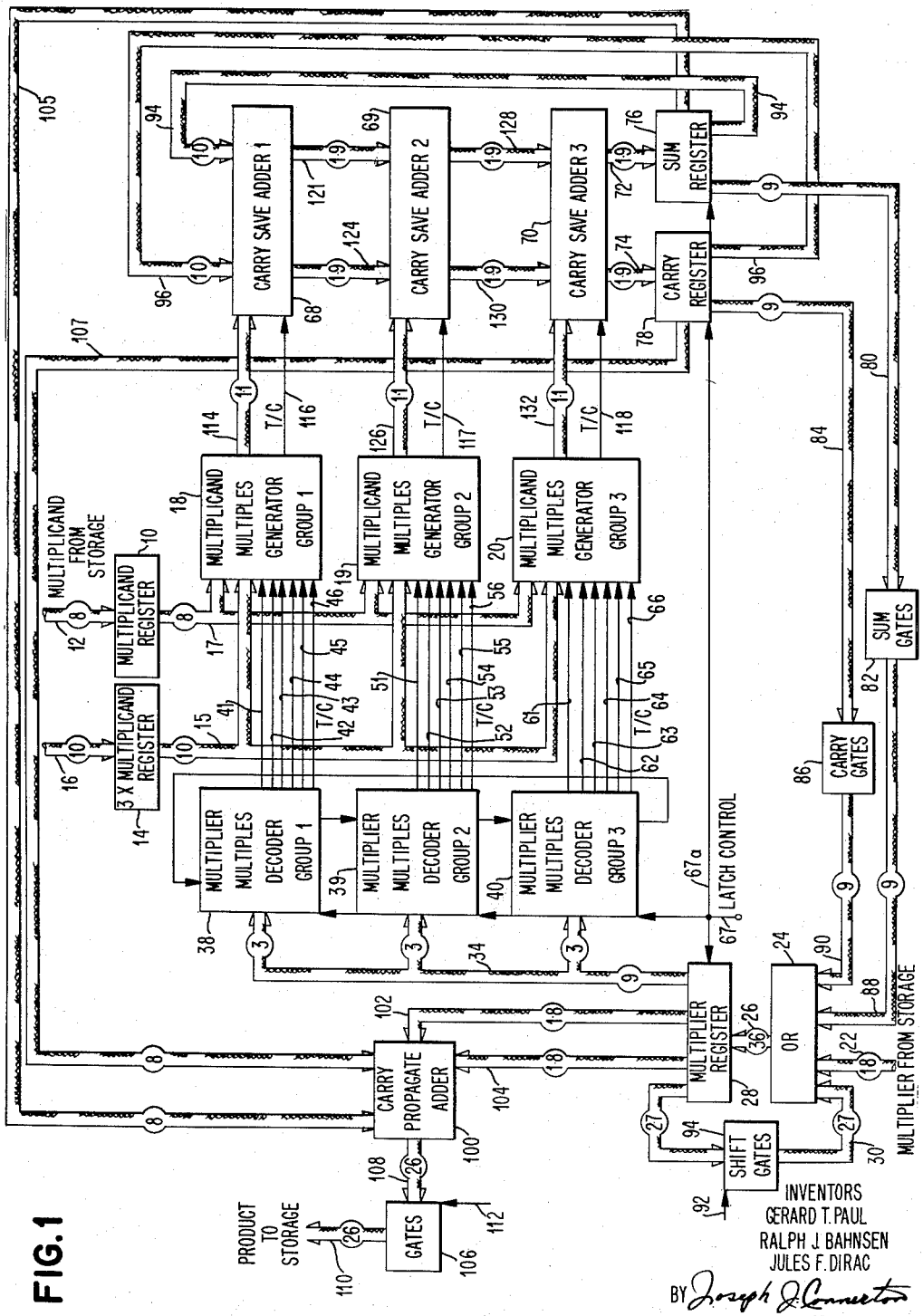
FIG. 1 illustrates in block form a multiplier arrangement according to this invention.

A multiplier arrangement according to this invention is illustrated in block form in FIG. 1. The device will be described under an assumed multiplier of 18 bits and a multiplicand of 8 bits, which when multiplied produce a 26 bit product. Referring now to FIG. 1, a multiplicand register 10 receives and stores signals representing multiplicand information on 8 lines disposed within a cable 12. A quantity equal to three times the multiplicand is stored in the 3× multiplicand register 14 and is supplied from any convenient source via the 10 conductors disposed in cable 16. Before starting the multiplication operation, it is assumed that all registers are cleared by some conventional means not shown, which in the preferred embodiment herein described consists of inserting 0's into the latch circuits of each register and the latch circuits of associated control devices. Output signals representing multiplicand information are supplied from multiplicand register 10 on 8 conductors disposed within a cable 17 to multiplicand multiples generators 18, 19 and 20 identified as groups 1, 2 and 3 respectively. Signals representing the multiplier disposed within the 18 conductors of cable 22 are supplied through Or circuit 24 and cable 26 to the multiplier register 28. Considering the multiplier register as comprising two equal sections wherein the multiplier is initially stored in the right section, as the multiplier is shifted to the right during the multiplication process, partial carry products are stored in the left-hand portion of register 28 and partial sums in that portion of the right-hand section which is cleared as the multiplier is shifted to the right. Cables 30, 31 and 32, which also convey information to the multiplier register 28 through Or circuit 24, are discussed subsequently.

The lowest order bits of the multiplier are disposed in the right-most positions of register 28, and signals from the nine lowest order bits are conveyed along the conductors of cable 34 to multiplier multiples decoders 38, 39 and 40 identified as groups 1, 2 and 3 respectively. Bits 1, 2 and 3 are coupled to the group 1 decoder 38, bits 4, 5 and 6 to group 2 decoder 39 and bits 7, 8 and 9 to the group 3 decoder 40, the bits progressing in binary fashion with bit 1 of the lowest order bit. Multiplier-multiples decoders 38–40 determine from the associated group of multiplier bits which multiples of the multiplicand are to be accumulated during the generation of a partial product for the corresponding bits of the multiplier and energize the appropriate multiple output line. Output lines 41–45 interconnect group 1 decoder 38 to the group 1 multiplicand multiples generator 18, conductors 51–55 interconnect group 2 decoder 39 to multiplicand multiples generator 19 while conductors 61–65 interconnect group 3 decoder 40 to group 3 multiplicand-multiples generator 20. As discussed more fully hereinafter, a total of 5 multiplicand multiples are available from each multiplier multiples decoder. Lines 46, 56, and 66 are the respective true complement lines interconnecting decoders 38–40 to multiplicand-multiples generators 18–20, respectively, and function to distinguish whether the 1× or 3× multiple is to be added in true or complement form to provide the selected multiple. Upon application of a control signal to latch control conductor 67, decoders 38, 39 and 40 decode multiplier bits 1–9 and energize the selected input to multiplicand-multiples generators 18–20, which in turn apply the selected multiplicand multiples to respective tandem connected carry save adders 68, 69 and 70. Carry save adders 68, 69 and 70 generate partial product 1 which is then applied in the form of signals on conductors disposed within cables 72 and 74 to the sum and carry registers 76 and 78 respectively. Signals representative of the lowest nine bits of sum of the first partial product are conveyed via conductors disposed within cable 80 to sum gates 82, while signals representative of the lowest nine bits of carry of the first partial product are conveyed via conductors disposed within cable 84 to the carry gates 86, from whence they are conveyed via cables 88 and 90 respectively, Or circuit 24 and cable 26 to multiplier register 28. The sum bits are stored in positions 10–18, while the carry are bits stored in positions 28–36 of multiplier register 28. This completes the generation of partial product 1.

Upon application of a suitable control signal to line 92, shift gates 94 are actuated causing the multiplier register to be shifted nine positions to the right. When the control pulse on latch control line 67 terminates, bits 10–18 of the multiplier are stored in bit positions 1–9 of the multiplier register 28.

Bits 1–9, former multiplier bits 10–18, are then decoded in the above-described manner by multiplier multiples decoders 38, 39 and 40 and signals representative of selected multiples of the multiplier are stored in the decoder latch register circuits. Partial product 2 is next generated in carry save adders 68, 69 and 70 in the manner above-described. Upon application of a latch control signal to conductor 67a, the left most or higher order 10 bits of sum and carry of partial product 1, which had been stored in sum and carry registers 76 and 78, are re-entered into carry save adder 1 through the conductors disposed in cables 94 and 96 and caused to ripple through carry save adders 69 and 70 during the generation of partial product 2. If the output from multiplier multiples decoder 40 indicates a subtract operation, then the generation of a third partial product is required; if the output from decoder 40 indicates an add operation, then no further accumulation of partial products would be required. Thus, whenever the final operation defined by the multiple from the group 3 multiplier multiples decoder is subtract, an extra add operation with a corresponding partial product generation is required. Assuming that group 3 decoder 40 indicates subtract, a special latch register circuit stores this indication. In response to this indication, multiplier multiples decoder groups 1–3 are operated, with group 1 supplying a multiple of 1 and groups 2 and 3 a multiple of 0. During this period, the nine low order bits of partial product 2, stored in the sum and carry registers 76 and 78 respectively, are applied via the path heretofore described to positions 10–18 and 28–36 respectively of multiplier register 28, while partial product 1 is stored in multiplier register positions 1–9 and 19–27. Also, during generation of partial product 3, the left most ten bits of partial product 2 are re-entered into carry save adder 68. During the ensuing period, the latch control signal applied to conductor 67a is effective to store the partial product 3 in the sum and carry registers 76 and 78 respectively. No pulse is applied to latch control line 67 at this time since it would cause the multiplier register 28 to shift to the right and thereby destroy part of the answer now stored in this register. Eighteen bits of sum and eighteen bits of carry are applied to carry propagate adder 100 through conductors disposed in cables 102 and 104, while the remaining eight bits of sum and carry from partial product 3 are applied to adder 100 from the sum and carry registers 76 and 78 via the 8 conductors disposed within cables 105 and 107. The carry propagate adder 100 combines 26 bits of sum and carry and the resultant product conditions output gates 106 through 26 conductors disposed in cable 108. The product may be read out on the conductors disposed in output cable 110 upon application of a control signal to line 112.

Carry save adders 68 through 70 are connected in tandem, and perform the function of accumulating the proper partial product for each nine bits of the multiplier. Each carry save adder receives three sets of input signals during the generation of each partial product. On the first partial product generated, the carry save adder 68 receives information representing zeros from the sum and carry registers 76 and 78 respectively, since these registers are initially in the cleared condition. A third set of input signals representing the selected multiplicand multiple are applied to carry save adder 68 via the conductors in cable 114. Accordingly, it is seen that signals representing three numbers are supplied to carry save adder 68 via cables 94, 96 and 114. Carry save adder 68 generates one set of output signals representing the sum, which is applied via the conductors disposed on cable 121 as one input to carry save adder 69. A set of output signals representative of the carries generated by carry save adder 1 is applied via the conductors disposed in cable 124 as a second input to carry save adder 69. The third set of input signals representing the selected multiplicand multiple from multiplicand multiples generator 19 are applied to carry save adder 69 via the conductors disposed in cable 126. Sum and carry signals are generated for the three inputs supplied to the carry save adder 69. The sum signals are conveyed along the conductors of a cable 128 as one input to carry save adder 70, while the carry signals are conveyed along the conductors of a cable 130 as a second input to the carry save adder 70. The third input to carry save adder 70 is the selected multiplicand multiple supplied along the conductors of cable 132 from the group 3 multiplicand multiples generator 20. Carry save adder 70 provides a partial product comprising 19 bits of sum and 19 bits of carry signals which are stored in sum and carry registers 76 and 78 via cables 72 and 74 respectively.

As heretofore described, the nine lowest order bits of the sum register 76 are transferred along the conductors of a cable 80 through gates 82, cable 88, thence via Or circuit 24 and cable 26 to bit positions 10–18 of the multiplier register 28. Carry signals from bit positions 1–9, the nine lowest order bits of the carry register 78, are conveyed along the conductors of the cable 84 through gates 86, cable 90, Or circuit 24 and cable 26 to bit positions 28–36 of the multiplier register 28. Signals stored in bit positions 10–19 of sum register 76 and corresponding signals stored in bit positions 10–19 of the carry register 78 remain stored within the respective registers after each partial product generation. During the subsequent partial products which are generated, these sum signals of the previous partial product are applied via the conductors of cable 94 as one input to the carry save adder 68, and the corresponding carry signals are conveyed via the conductors of cable 96 as a second input to the carry save adder 1. To generate the next partial product, the information in the multiplier register 28 is shifted nine positions to the right which supplies the next nine multiplier bits to be decoded and clears a portion of the multiplier register to store the next nine bits of sum and carry signals from respective sum and carry registers 76 and 78. The multiples of the multiplicand supplied on the conductors of cables 114, 126 and 132 to respective carry save adders 68, 69 and 70 are modified as required by the next nine bits of the multiplier, and the partial product for these nine bits is accumulated in the carry save adders 68–70 in the manner described above. After the last partial product is generated, the third in the illustrated example, the 18 bits of sum and carry information from multiplier register 28 are applied to corresponding order position of carry propagate adder 100 through the conductors of cables 102 and 104 respectively. The final 8 bits of sum and carry are applied directly from sum and carry registers 76 and 78 via the conductors of cables 105 and 107 to carry propagate adder 100. Carry propagate adder 100 generates the resultant final product, which, and as heretofore noted, may be transferred via gates 106 and cable 110 to a load device not shown.

Figure 4:
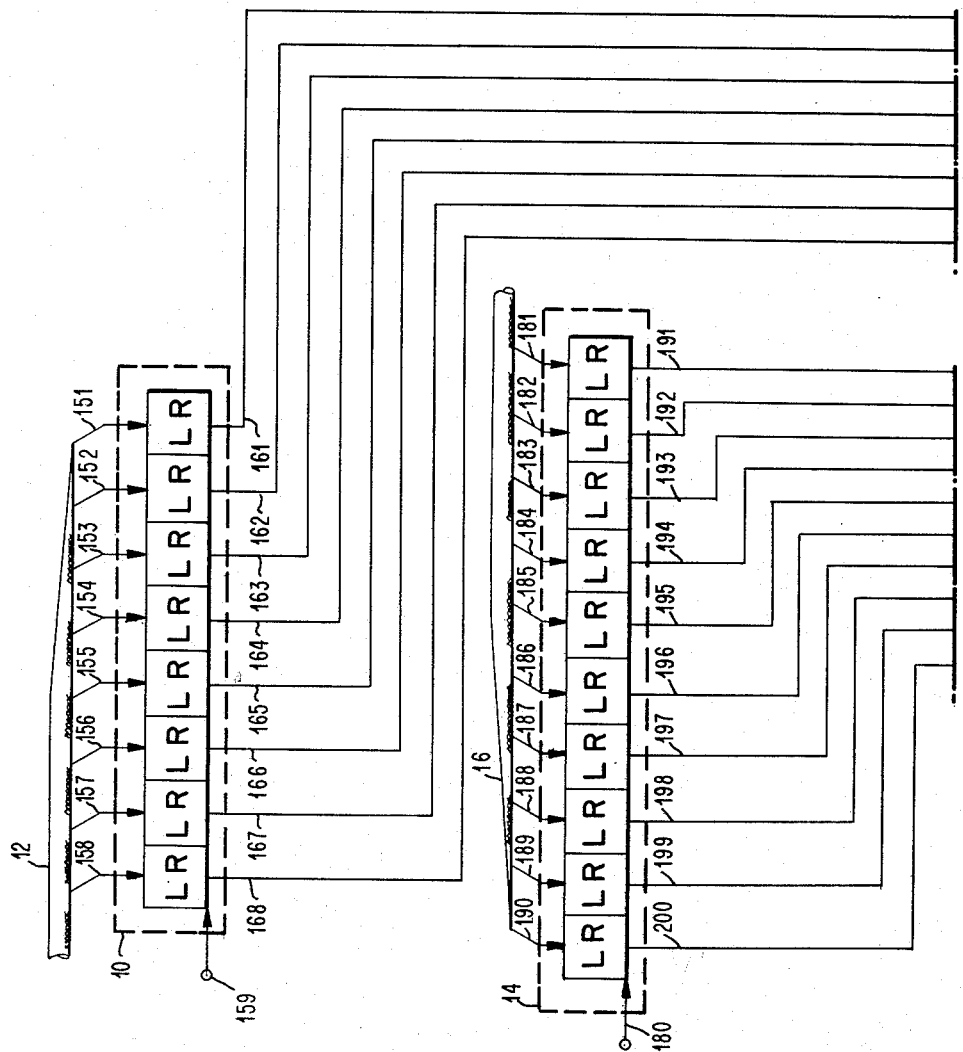
Figure 5:
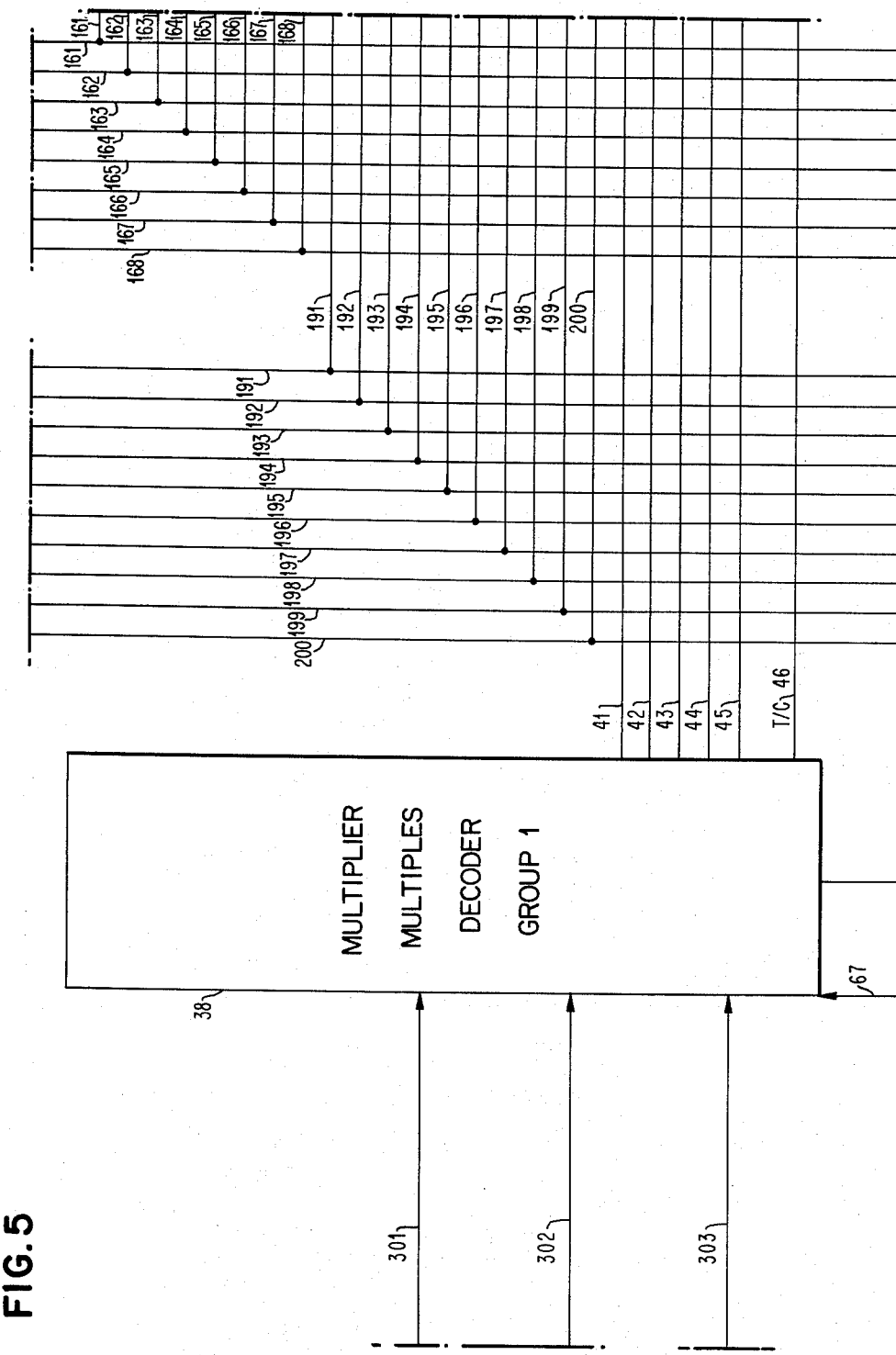

The multiplier arrangement illustrated in simplified block form in FIG. 1 is shown in detail in FIGS. 2 through 25, reference being made to FIG. 26 which indicates the arrangement in which FIGS. 2 through 25 are interconnected. Referring first to FIG. 4, the multiplicand register 10, hereinafter designated MCD Reg, shown in block form in FIG. 1, is illustrated in detail as a latch register having individual latch register stages 1–8, latch register stage 1 representing the lowest order stage of the multiplicand register 10. Signals representing information are supplied along conductors 151 through 158 of the cable 12 to respect latch registers stages 1–8. The signals on the conductor 151 through 158 may have either of two levels with a mort positive level representing binary 1 and a more negative level representing binary 0. Hereinafter, the more positive level is arbitrarily assumed to be a plus signal and the more negative level is arbitrarily assumed to be a minus signal. The latch control signal is applied along a conductor 159 to each of latch registers stages 1–8, and when the latch control signal is positive, the individual latch register stages 1–8 are operated upon by signals on respective input lines 151 through 158. If signals on the input lines 151 through 158 are positive, the associated latch register stage is set to represent a binary one; whereas, if the signals on the input lines 151 through 158 are negative, the associated latch register stages are operated to represent a binary 0.

When the latch control signal on the line 159 changes from a negative value to a positive value, the individual latch register stages 1–8 operate to provide an ouput signal on lines 161 through 168 having the same polarity as the polarity of the corresponding input line on associated lines 151 through 158. It is pointed out that the output signals do not change their polarity to agree with the polarity of the associated input signals until the latch control signal on the conductor 159 goes positive. Furthermore, once the latch control signal on the line 159 goes positive, the polarity of the output signals on the lines 161 to 168 remain constant as long as the latch control signal on the line 159 remains positive even though the polarity of the input signals on associated conductors 151 through 158 may change. Accordingly, signals on the input lines 151 through 158 are effective to change the signals on the output lines 161 through 168 after a positive latch control signal is applied to the line 159.

The three times multiplicand register 14, hereinafter designated 3× MCD Reg, illustrated in block form in FIGURE 1, is illustrated in detail in FIG. 4 as a latch register having individual latch register stages 1–10. Latch register stage 1 is the low order stage of the 3× MCD Reg 14. Signals representing information are supplied along conductors 181 through 190 of the cable 16 to respective latch register stages 1 through 10. The type signals employed and the operation of the latch register stages are identical to those described with respect to multiplicand register 10. Thus, if signals on the input lines 181–190 are positive, the associated latch register stage is set to represent a binary one; whereas, if the signals on the input lines 181–190 are negative, the associated latch register stages are operated to represent a binary zero when the latch control signal on conductor 180 goes positive. When the latch control signal on the line 180 changes from a negative to a positive value, the individual latch register stages 1 through 10 operate to provide an output signal on lines 191 through 200, having the same polarity as the polarity of the input signal on associated input lines 181 through 190. Output signals from MCD Register 10 on lines 161 through 168 are connected through FIG. 5 to the multiplicand multiples generator 18 in FIG. 6, multiplicand multiples generator 19 in FIG. 11 and multiplicand multiples generator 20 in FIG. 16.

Figure 13:
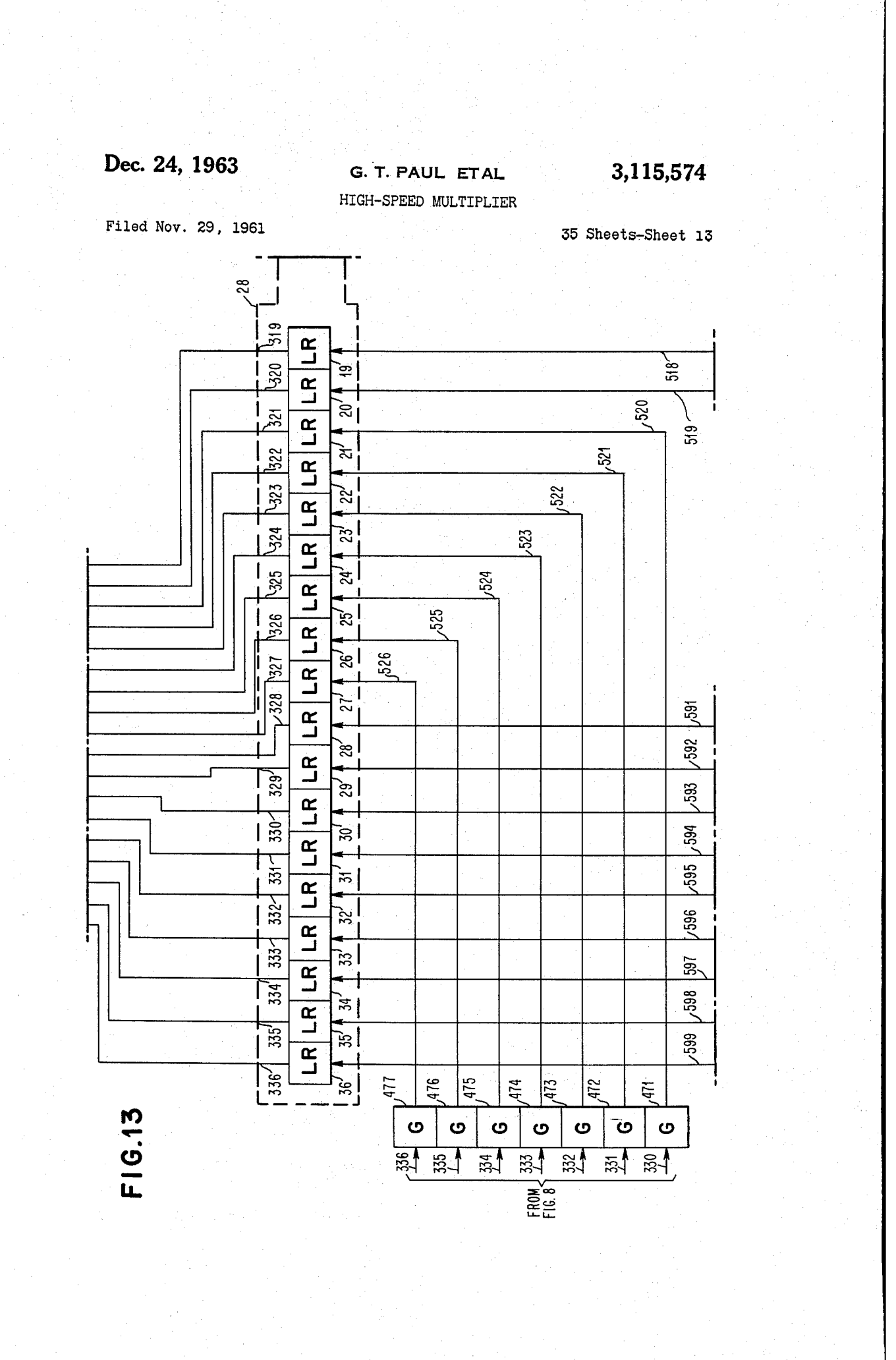
Figure 14:
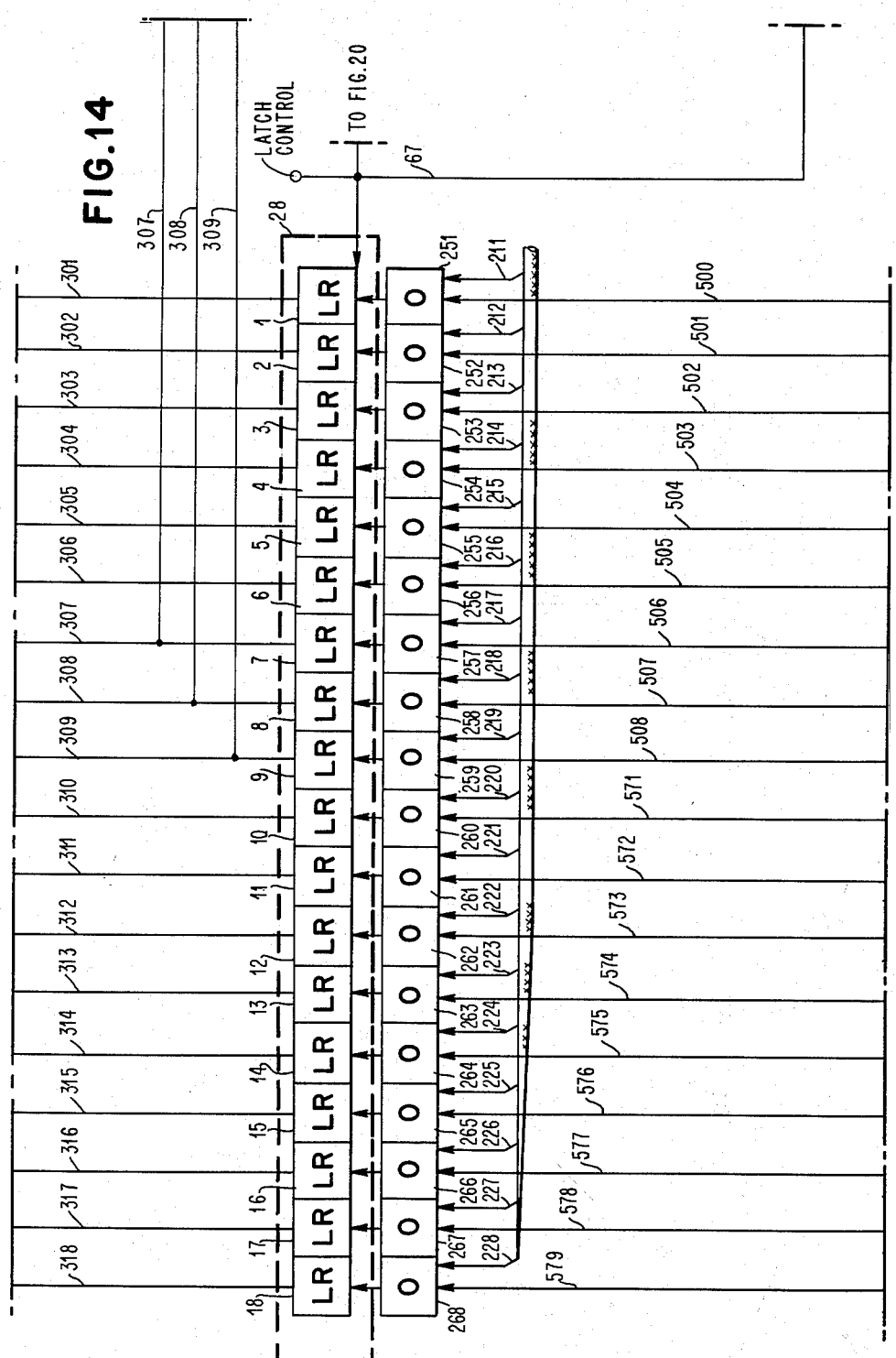
Figure 15:
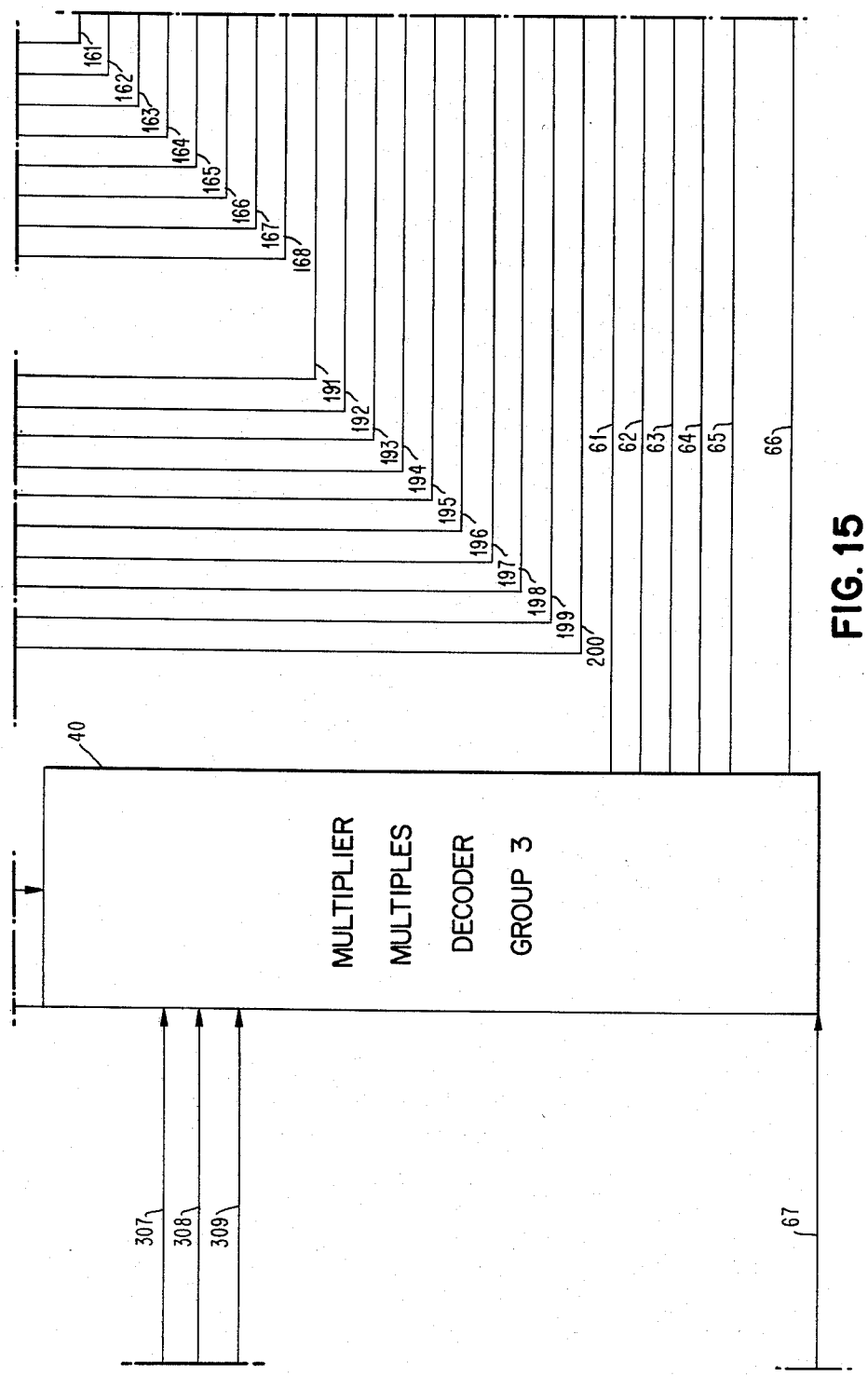

Before describing the operation of a multiplicand multiples generators 18, 19 and 20, the operation of the multiplier multiples decoders 38, 39 and 40, which provide control inputs to the multiplicand multiples generators, will be described. Reference is made to FIGS. 13 and 14 wherein the multiplier register 28, shown in block form in FIG. 1, is illustrated in detail. The multiplier register 28 in FIGS. 13 and 14 is a latch register composed of individual latch register stages 1–36 which prior to starting are assumed to be cleared. A latch control singal on conductor 67 operates the latch register 28 to store 18 bits of information supplied on input lines 211 through 228 in the manner explained heretofore with respect to the multiplicand register 10 in FIG. 5. While Or circuit 24 in FIG. 1 has been illustrated as being applied to all inputs to the multiplier register 28 for the sake of clairty, it will be evident that only that portion of the latch register having two or more inputs applied to a common latch register stage requires a logical Or circuit. Accordingly, Or circuits 251 through 268, as illustrated are associated with the right most 18 bits of the latch register shown as latch register circuits 1 through 18. Latch register stages 1 through 18 have the requirement, and Or circuits 251 through 268 are employed. Latch register stages 1 through 36 of the multiplier register 28 in FIGS. 13 and 14 have respective output conductors 301 through 336. The output lines 301 through 303 starting at FIG. 14 pass through FIGS. 9 and 3 before terminating in the multiplier multiples decoder 38 in FIG. 5. The operation of the latch register itself provides the necessary control to ensure that the contents of the latch register stages 1 through 9 of multiplier register 28 are applied to the multiplier multiples decoders 38, 39 and 40 at the desired time. In like manner conductors 304, 305 and 306 connect bits 4, 5 and 6 of the multiplier register 28 through FIG. 9 to the group 2 multiplier multiples decoder 39 in FIG. 10. Similarly output conductors 307, 308 and 309, bits 7, 8 and 9 of multiplier register 28 are applied to the group 3 multiplier multiples decoder 40 in FIG. 15. As will be shown and described in greater detail hereinafter, the group 1, 2 and 3 multiplier multiples decoders 38, 39 and 40 decode the three bit information supplied from multiplier register 28 to provide one of five multiple outputs indicated by the energized conductors 301–309 connected directly to such decoders.

In the present invention, multiples of 1, 2, 3, 4 and 6 times multiplicand are represented on conductors 41, 42, 43, 44 and 45 respectively. Similarly the same multiples are available from multiplier multiple decoders 39 and 40 on conductors 51 through 55 and 61 through 65 respectively. Since the one and three multiples must be available in positive or negative form, a true or complement control output is provided on conductors 46, 56 and 66 for each multiplier mulitple decoder to the associated multiplicand multiples generator. For any of the five selected multiples in true form, the true line will be energized; for the five or seven times multiple, the three or one times multiple line will be energized and the complement control line associated with the multipler multiples decoder will also be energized. The details of operation of multiplier multiples decoders will be described in greater detail hereinafter. However, for purposes of the present description, the multiplier multiples decoders contain latch register circuits in which the results of decoding nine bits of the multiplier are stored.

Figure 6:
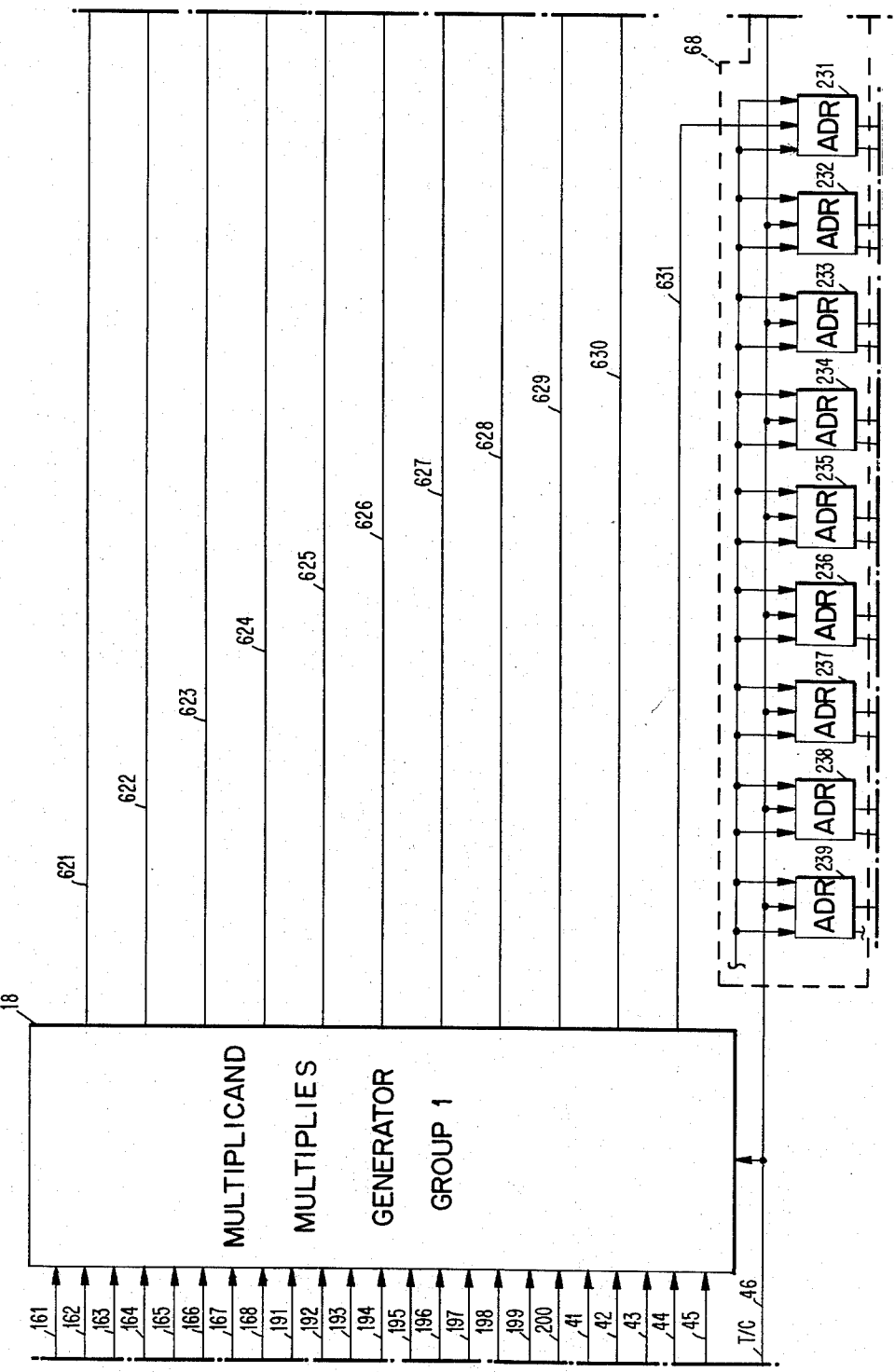
Figure 11:
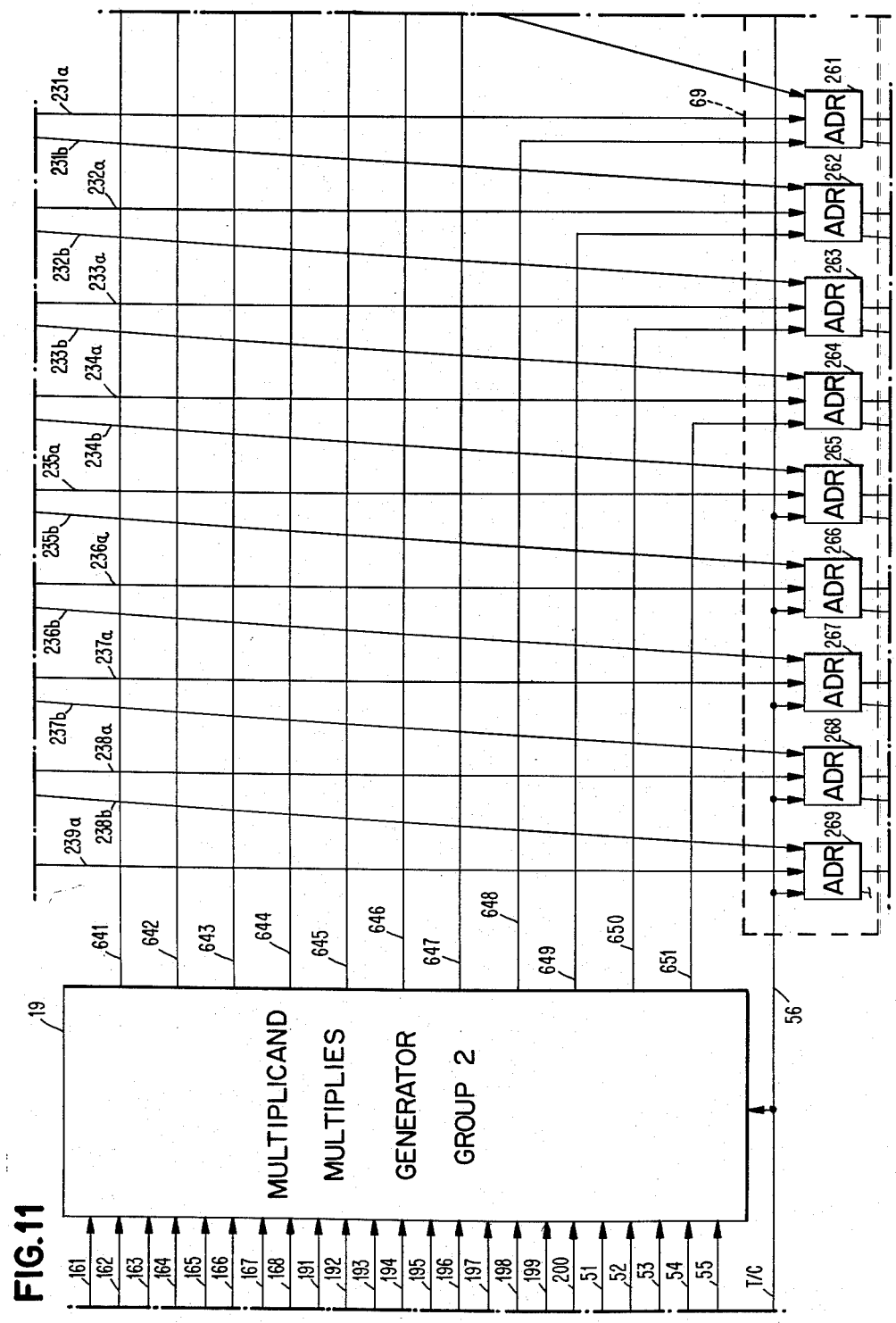
Figure 16:
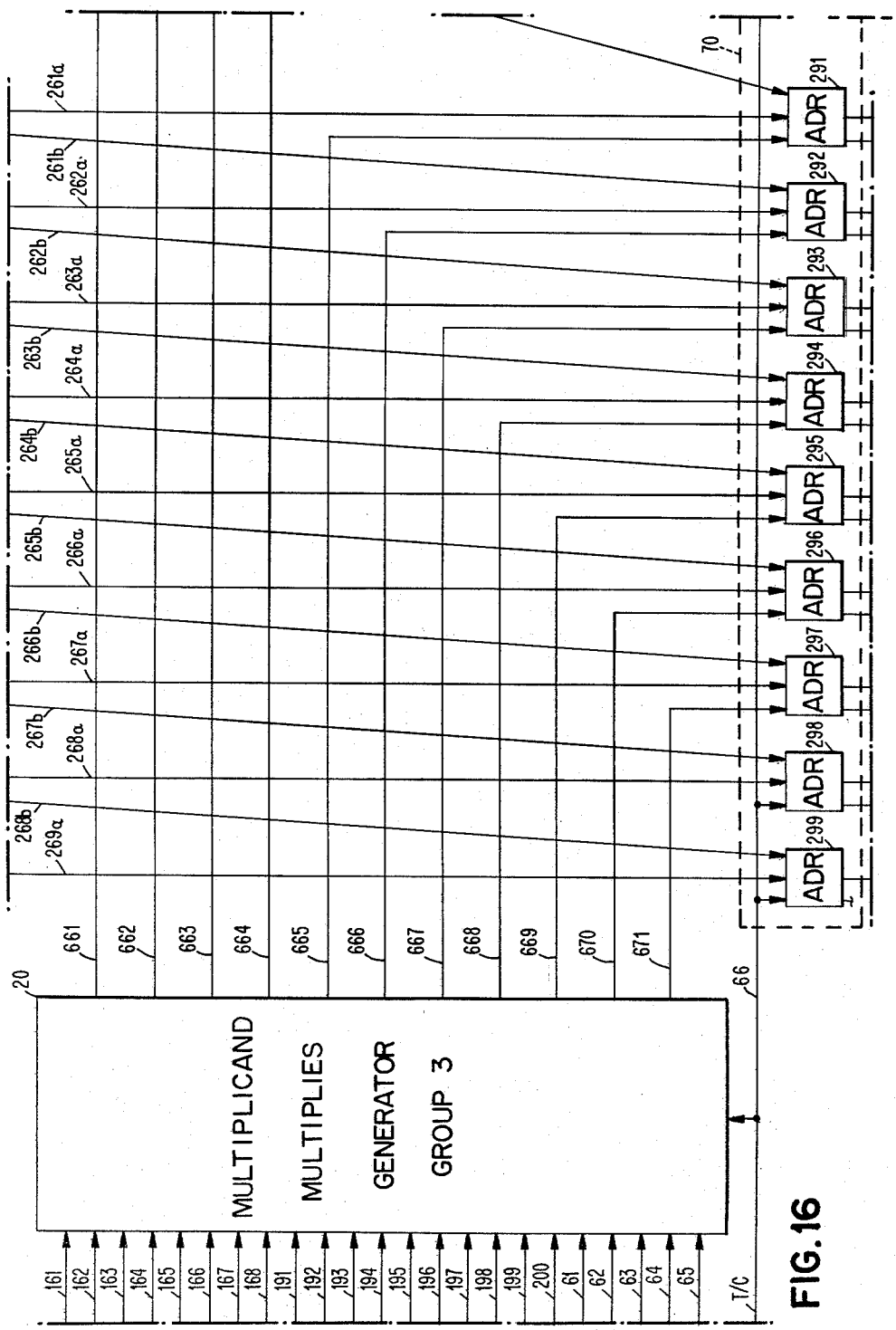
Figure 17:
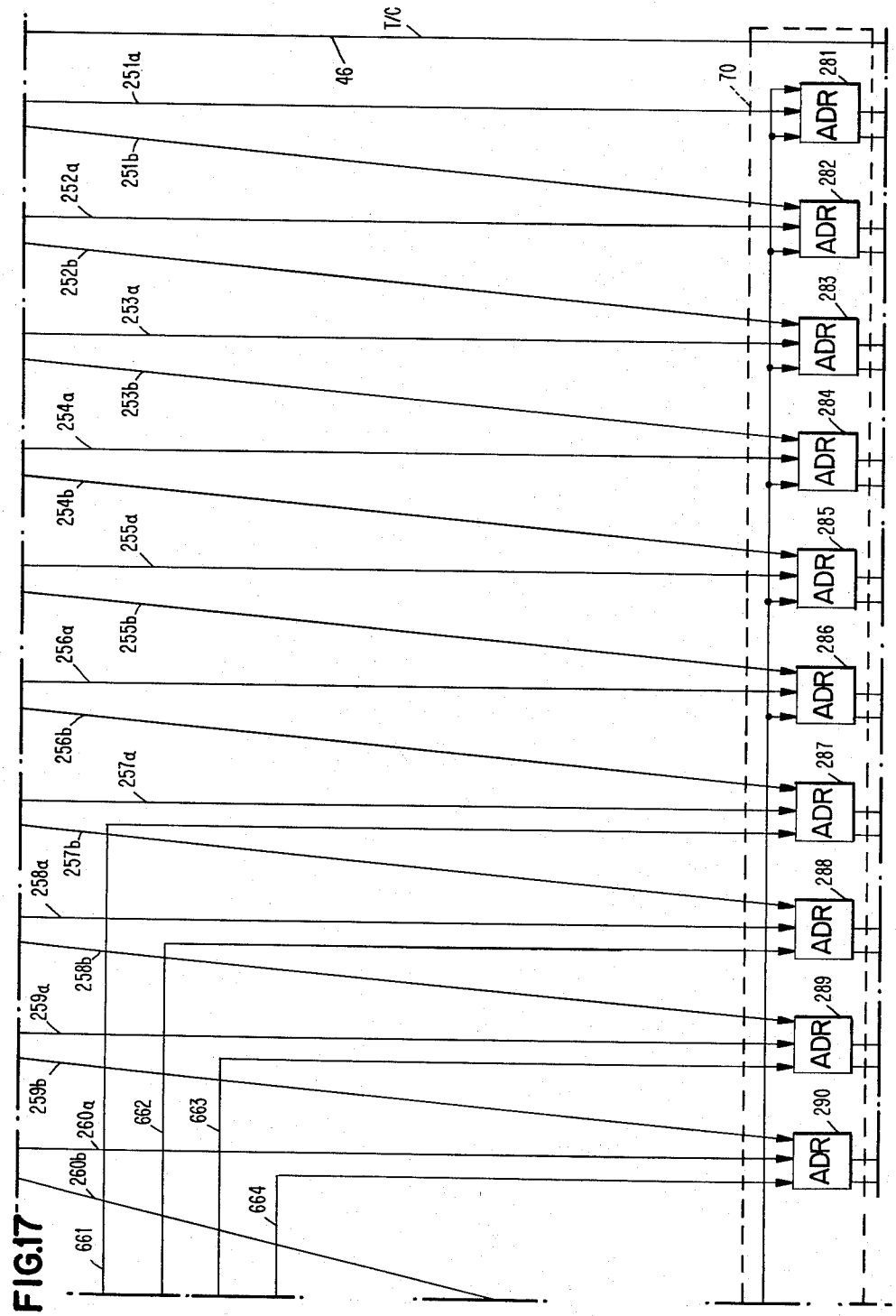
Figure 18:
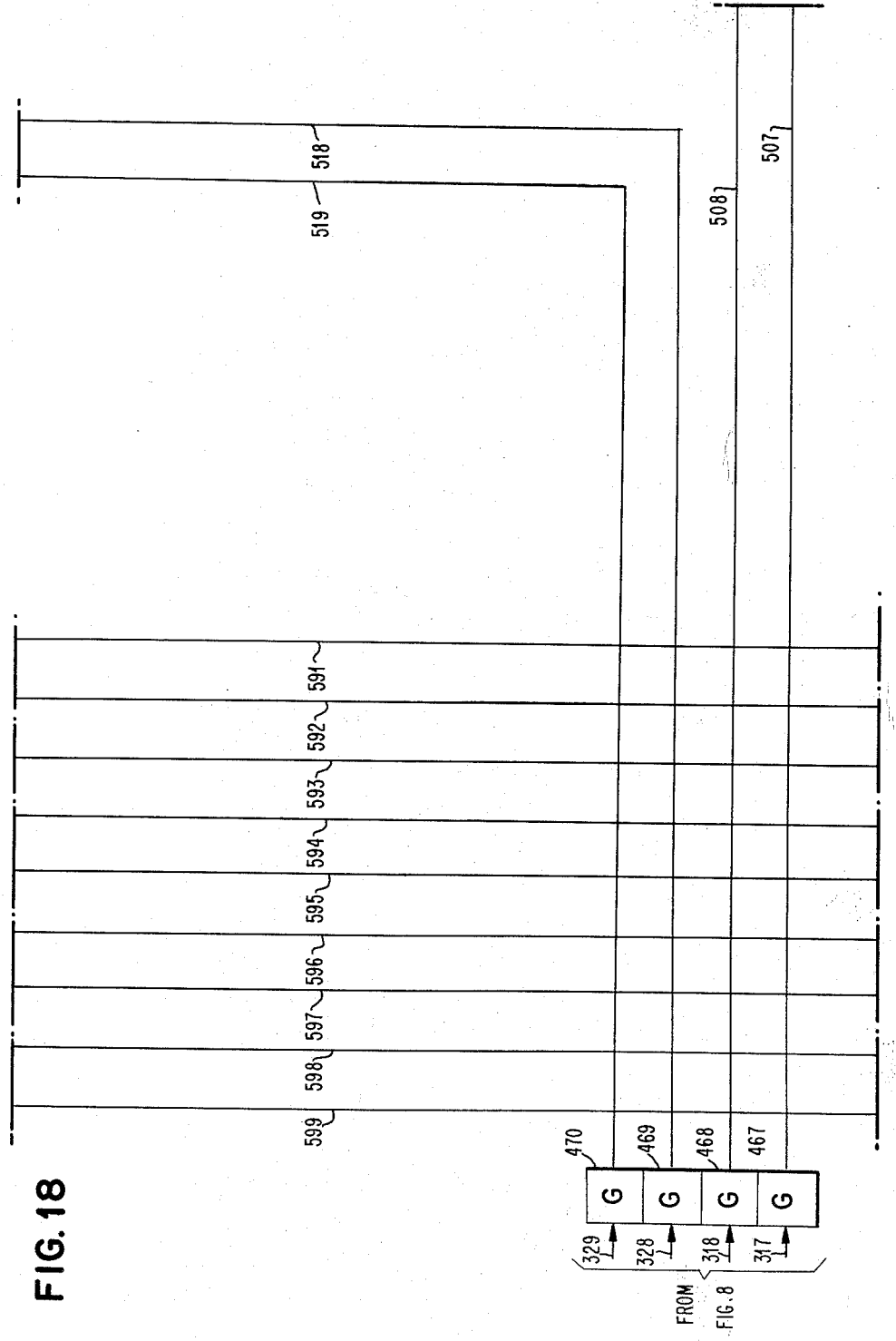
Figure 19:
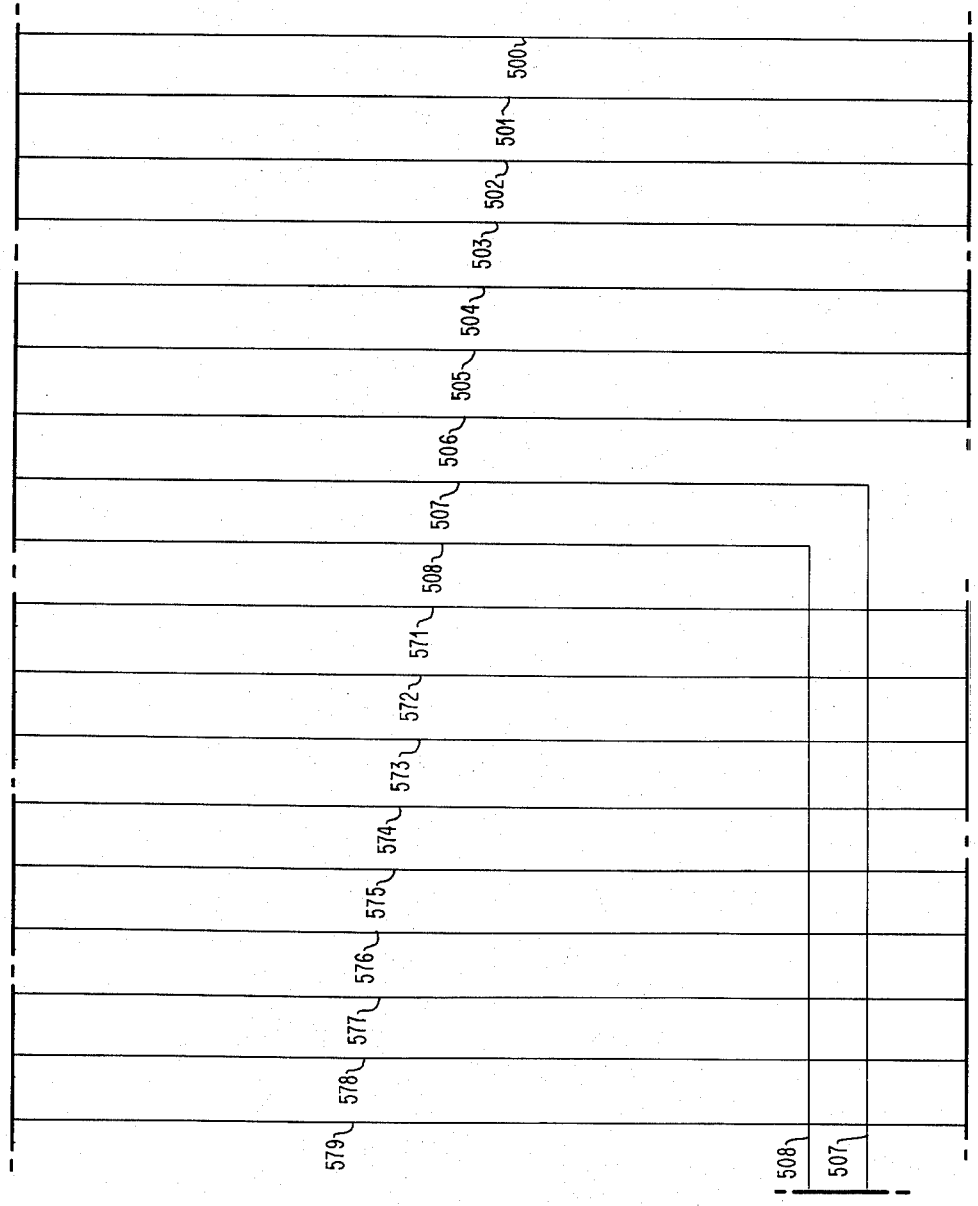
Figure 20:
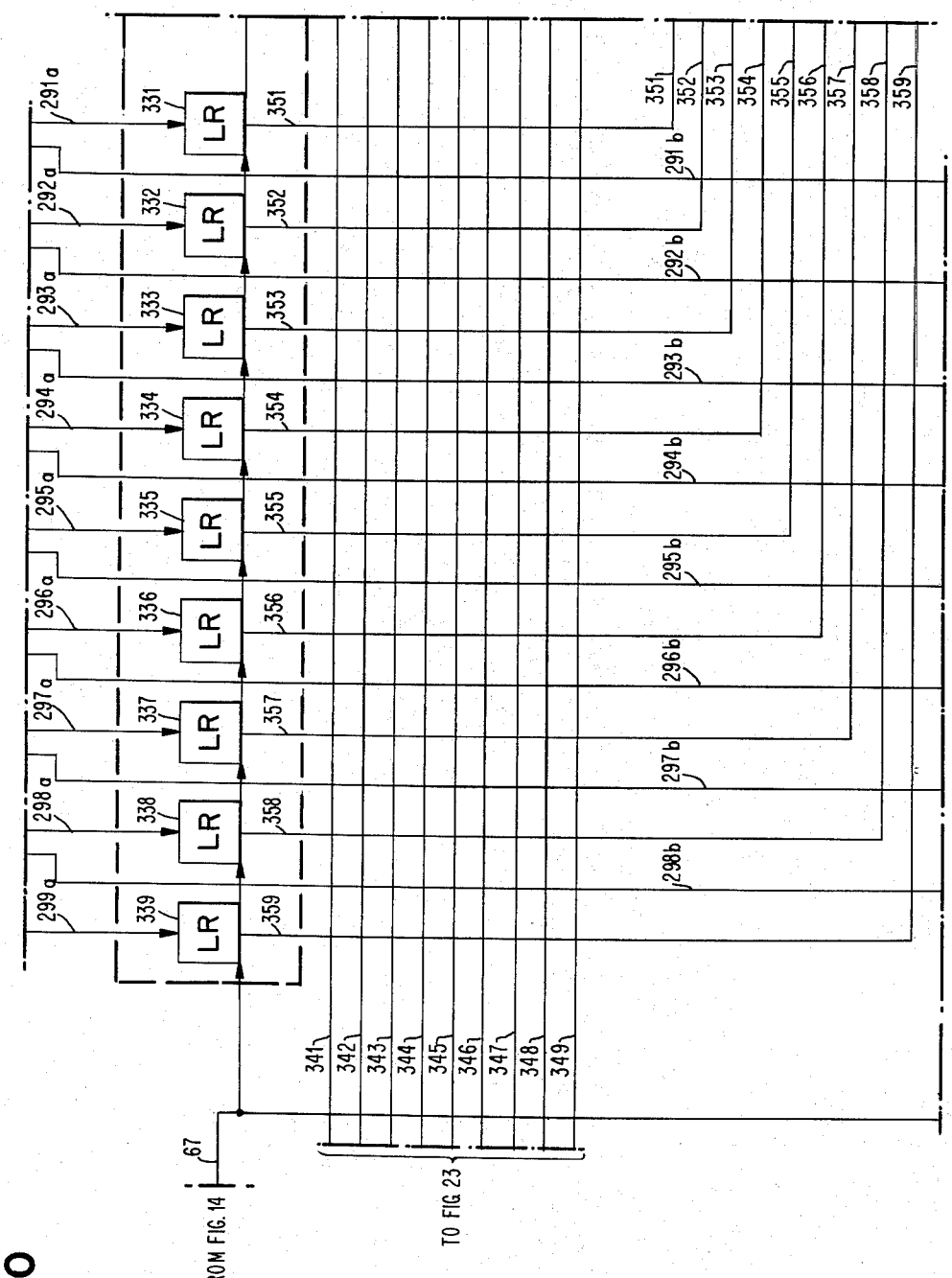
Figure 21:
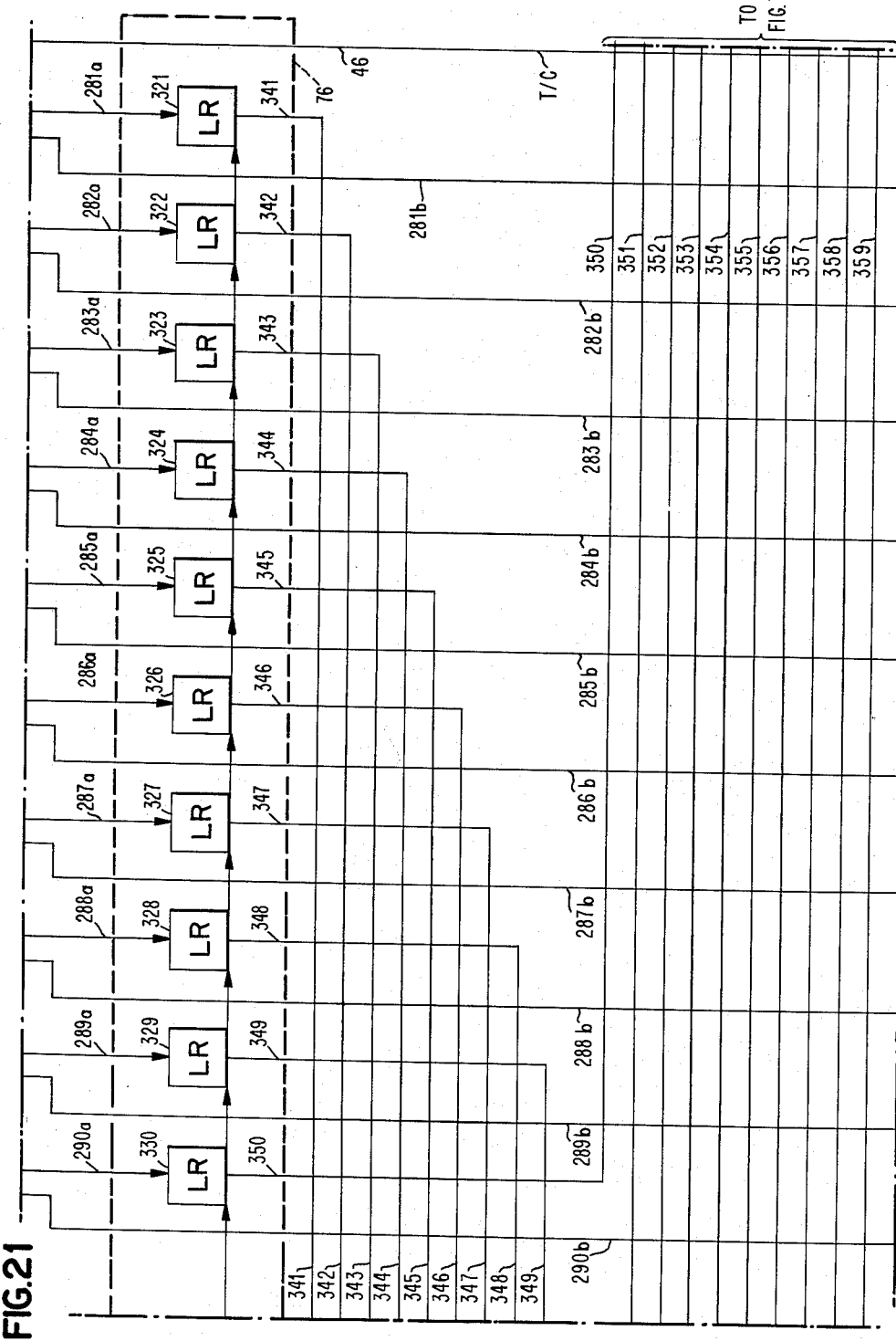
Figure 24:
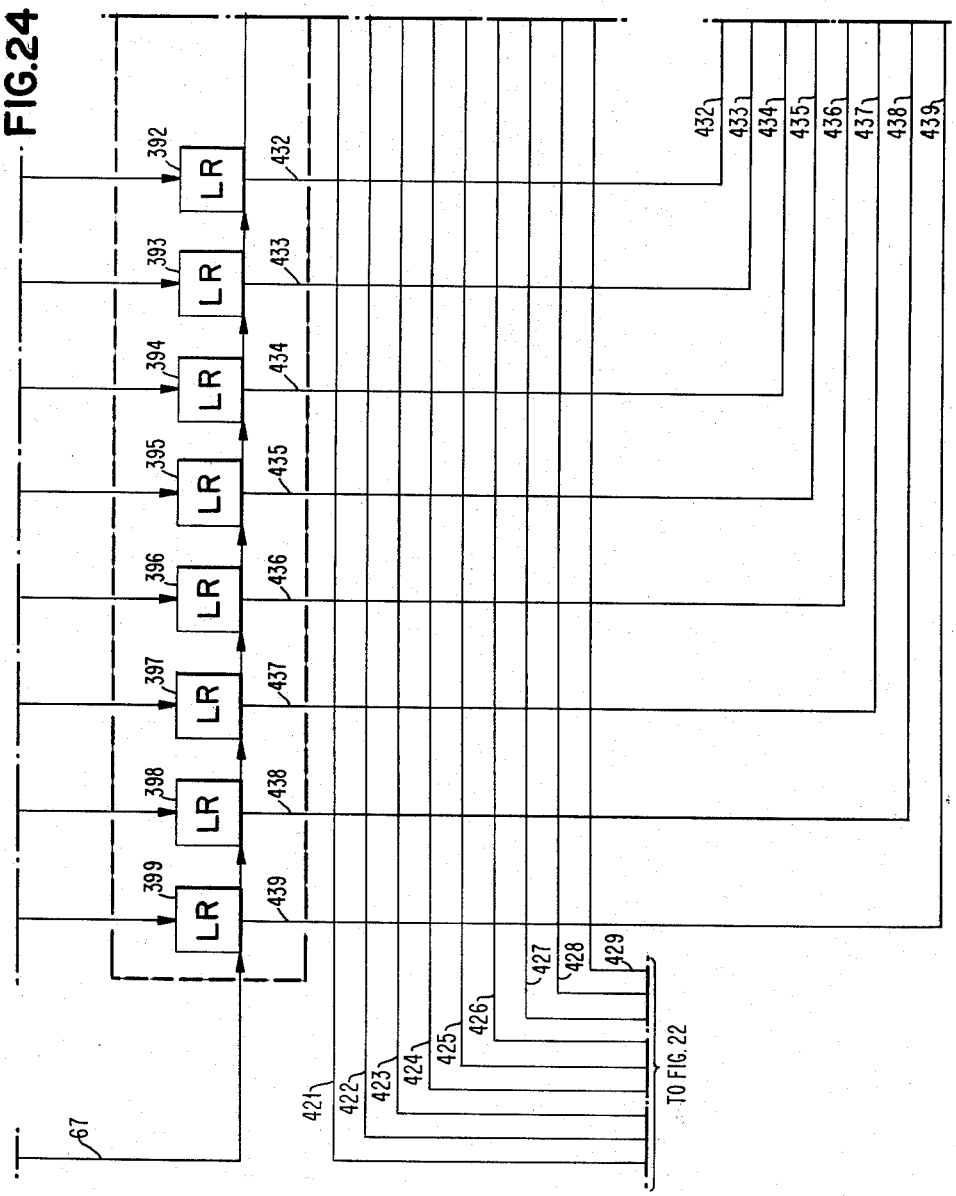
Figure 25:
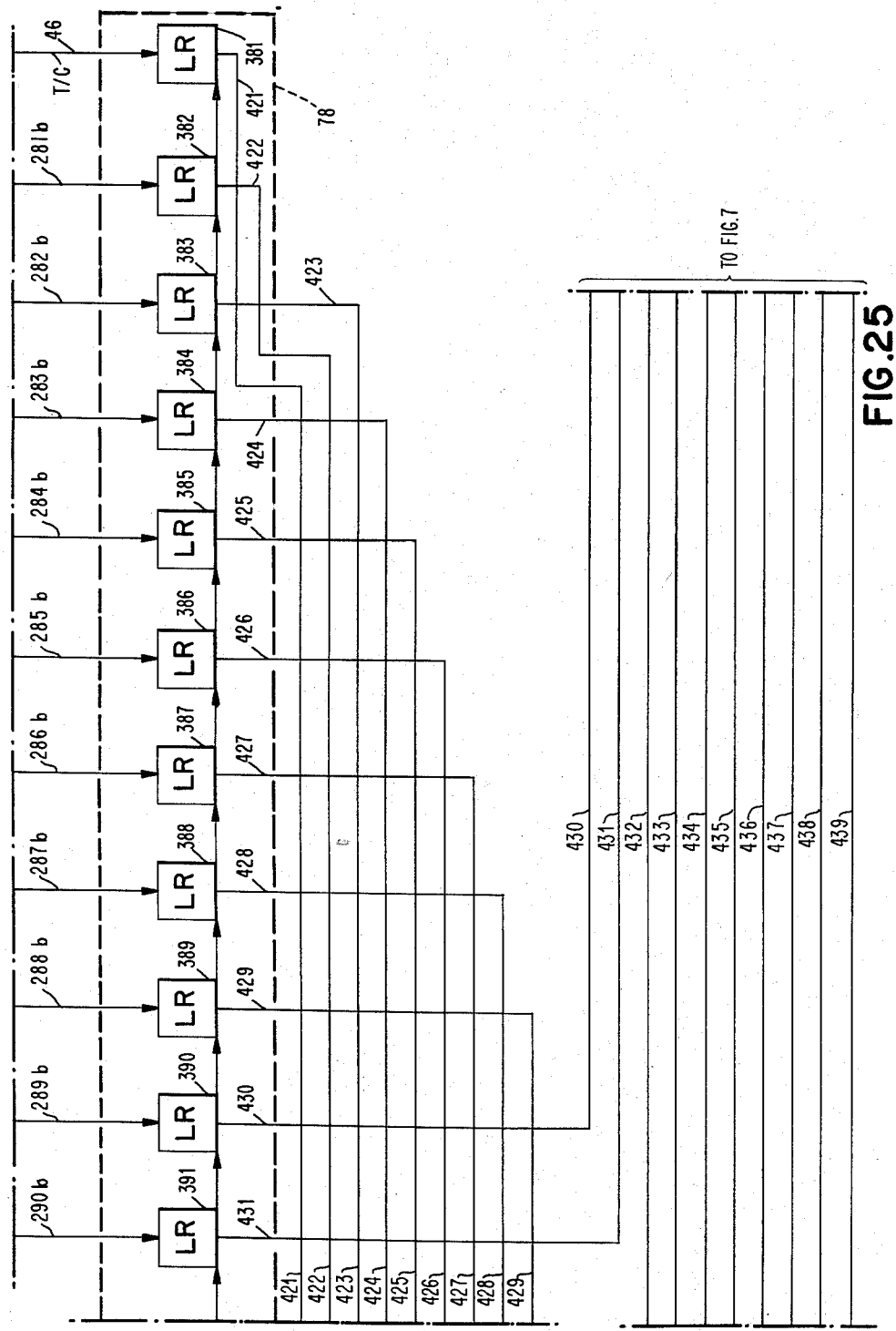

The multiplicand multiples generators 18, 19 and 20 are shown in FIGS. 6, 11 and 16 respectively. The multiplicand multiples generator 18 in FIG. 6 receives signals representative of the multiplicand on lines 161 through 168 from the multiplicand register 10 in FIG. 4 and signals representative of the multiplicand from the 3× MCD Reg 14 on lines 191 through 200. The same inputs on the above identified conductors are also applied to the multiplicand multiples generators 19 and 20. The selected multiple from the multiplier multiples decoders are applied to the corresponding multiplicand multiples generator through the conductors associated with the particular group. For example, the group 1 multiplier multiples decoder is connected to the group 1 multiplicand multiples generator by conductors 41 through 45; likewise since these outputs must be available in true or complement form, the true and complement conductor 46 is also applied to multiplicand multiples generator 18. The carry save adders 68 in FIG. 1 includes individual adder circuits 221 through 239, carry save adders 69 in FIG. 1 includes individual adder circuits 251 through 269 while carry save adders 70 in FIG. 1 includes individual carry save adder circuits 281 through 299. The carry save adders 68 through 70 in FIGS. 6, 7; 11, 12 and 16, 17 have individual adder circuits each of which has three input conductors and two output conductors connected as illustrated in the various figures. The output conductors represent a sum and a carry. The sum output line has the same number as the associated adder circuit with the letter "a" affixed. The carry output conductor has the same number as the associated adder with the letter "b" affixed. For example, the adder 221 in the carry save adders 68 in FIG. 7 has a sum output line designated by 221a and a carry output line designated by 221b. The sum output lines 281a through 299a from the carry save adder 70 in FIGS. 16 and 17 are connected as input lines to respective individual latch register circuits 321 through 339 of the sum register 76 in FIGS. 20 and 21. Signals on the sum output lines 281a through 299a to the sum register 76 control the information stored in the latch registers 321 through 339 whenever the sum register 76 is operated by a signal on the latch control line 67. Output signals from the individual latch registers 321 through 339 appear on respective output lines 341 through 359. The output lines 341 through 349 are connected to respective gate circuits 371 through 379 which constitute the sum gates listed as block 82 in FIG. 1. Output lines 350 through 359 in FIGS. 20 and 21 are connected to respective adders 221 through 230 in FIG 7. Outputs 350 through 359 of the Sum Reg. 76 comprise the ten high order sum bits which are reapplied to the input of carry save adder 68 during the generation of the second and subsequent partial products. Output lines 341 through 348 in addition are applied directly via FIGS. 20 and 23 as inputs to carry propagate adder 100 in FIG. 2. For purposes of the present invention, satisfactory operation may be attained with the direct connection indicated. In a multi-purpose computer, however, should the carry propagate adder 100 in FIG. 2 be used for other functions, the inputs to the adder would be gated to afford the necessary control. The carry output lines 281b through 298b from carry save adder 70 in FIGS. 20 and 21 are connected to associated stages of the carry register 78 in FIGS. 24 and 25. The carry register 78 in FIGS. 24 and 25 is a latch register having individual latch register stages 381 through 399, and this latch register is operated by signals on the latch control line 67 which permits signals on the carry output lines 281b through 298b to store information in the manner explained above with respect to the multiplicand register 10 in FIG. 4. Since there is no normal carry input to the first stage of latch register 78, an auxiliary signal from the true/complement line 46 originating in the group 1 multiplier multiples decoder 38 (FIG. 5) is applied to latch register circuit 381. It is pointed out that the carry output lines from the carry save adder 70 in FIGS. 20 and 21 are connected to the carry register 78 in FIGS. 24 and 25 displaced one position to the left. This insures that carry signals are sent to the next higher order stage to produce a correct sum when at a subsequent time in the product generation information in the sum and carry registers is combined either in the carry propagate adder 100 or the carry save adders 68 through 70. The individual latch registers 381 through 399 of the carry register 78 have respective output lines 421 through 439. The output lines 421 through 429 are connected to respective gate circuits 451 through 459 which constitute the carry gates 86 indicated in block form in FIG. 1. These gate circuits are controlled by a signal on the line 460 which is connected to each of the gate circuits 451 through 459. The output lines 421 through 428 are also connected directly through FIG. 22 as inputs 421 through 428 of the carry propagate adder 100 in FIG. 2. Output lines 430 through 439 of carry register 78 are reapplied to adder circuits 221 through 230 of carry save adder 68 in FIG. 7. Thus the initial nine low order carry bits of each partial product summation may be applied to the multiplier register 28 as described hereinafter, while the ten higher order bits are reapplied to the adder circuits of carry save adder 68 in the generation of the second and subsequent partial products.

Reference is made to FIGS. 13 and 14 wherein the multiplier register 28 shown in block form in FIG. 1 is illustrated in detail. The multiplier register 28 in FIGS. 13 and 14 is a latch register composed of individual latch register stages 1 through 36. A latch control signal on the line 67 operates the latch register 28 to store information supplied on input lines in the manner explained above with respect to the multiplicand register 10 in FIG. 1. As illustrated in FIG. 1, information signals are supplied on a cable 22 from multiplier storage through Or circuit 24 and cable 26 to a multiplier register 28, and such signals represent the multiplier in a multiplication problem. The Or circuits indicated as block 24 in FIG. 1 actually, as heretofore described, comprise individual Or circuits 251 through 268 which are connected via conductors 211 through 228 to latch register stages 1 through 18.

As heretofore described, the nine lower order positions of latch register 28 constitute the inputs to the multiplier multiples decoders 38–40 and in addition are connected as inputs to the carry propagate adder 100 for the final summation of sum and carry signals. Output lines 310 through 318 in FIG. 14 are connected through FIGS. 9 and 3 to corresponding inputs of the carry propagate adder 100 in FIG. 2. Output lines 319 through 336 in FIG. 13 are connected through FIG. 8 to corresponding carry inputs to the carry propagate adder 100 in FIG. 2. In addition, output lines 310 through 318 in FIG. 13 are connected through FIG. 8 to respective gate circuits 460 through 468. The shift gates 460 through 477 constitute a set of And gates which are controlled by signals on a line 492. When the signal level on the line 92 is positive, signals on the lines 310 through 318 and 328 through 336 may pass through respective gates 460 through 477 to corresponding output lines 500 through 508 and 518 through 526 respectively. When the signal level on the line 92 is negative, the signal level on each of the output lines is negative. The And gates 460 through 468 have respective output lines 500 through 508 and 518 through 526 which are connected via Or circuits 251 through 259 to stages 1 through 9 of the multiplier register 28 in FIG. 14. And gates 469 through 477 have respective output lines 518 through 526 which are connected as input lines to respective latch register stages 19 through 27 of multiplier register 28 in FIG. 13. Stages 28 through 36 of the multiplier register 28 in FIG. 13 may receive signals on lines 591 through 599 which are applied from the gate circuits 451 through 459 respectively of carry gates 86. Stages 10 through 18 of the multiplier register 28 in FIG. 14 may receive signals through Or circuits 260 through 268 on respective lines 571 through 579 which are supplied with signals from respective gates circuits 371 through 379 designated as the sum gates 82 in FIG. 1. In addition, a third set of signals available to stages 1 through 18 of the multiplier register in FIG. 14 is provided by the conductors 211 through 228 of cable 22 which provide the multiplier signals from any suitable source such as the "multiplier from storage" input from FIG. 1.

Figure 2:
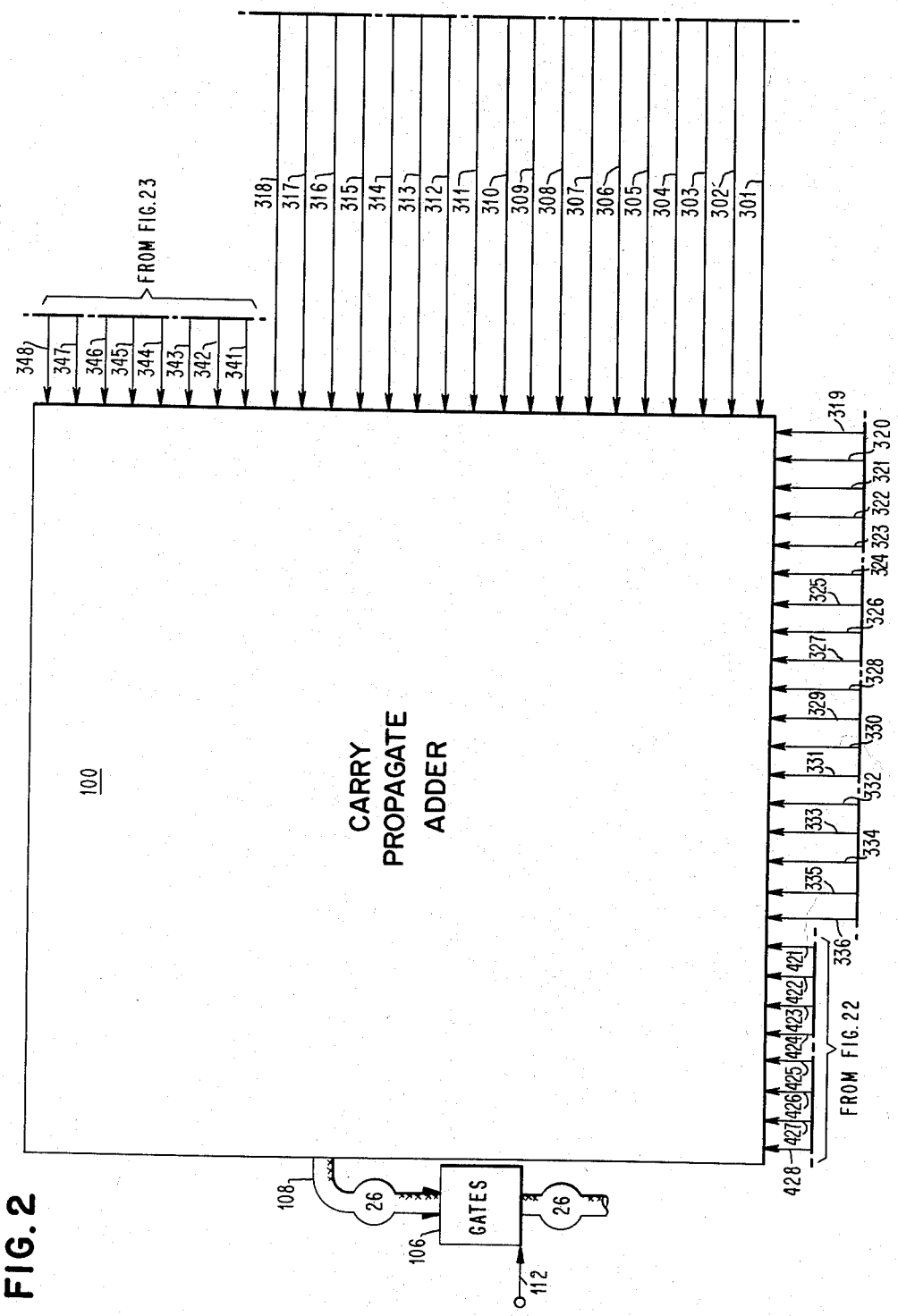
Figure 3:
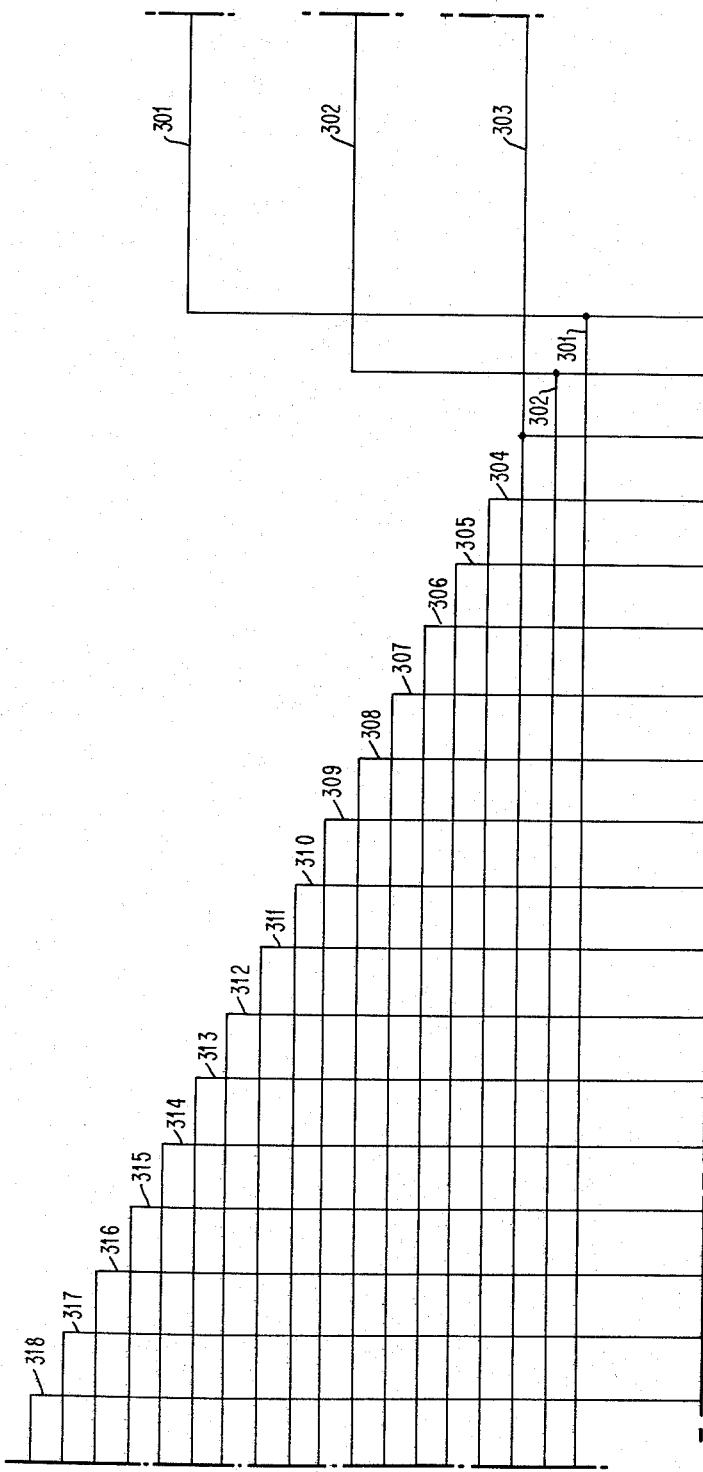

The carry propagate adder 100 in FIG. 2 has two sets of input lines, the augend representing a sum value and the addend representing a carry value. When the two values are added, the result is a final product. The input lines 301 through 318 and 341 through 348 convey signals representing a sum value; the input lines 319 through 336 and 421 through 428 convey signals representing a carry value. The input lines 301 through 318 to the carry propagate adder 100 in FIG. 2 convey sum signals which have been stored in stages 1 through 18 of the latch register 28 in FIG. 14 and the input lines 341 through 348 to the carry propagate adder 100 in FIG. 2 convey sum signals directly from respective stages 321 through 328 of the sum register 76 in FIG. 21. The input lines 319 through 336 to the carry propagate adder 100 in FIG. 2 convey carry signals from respective stages 19 through 36 of the latch register 28 in FIG. 13, and the input lines 421 through 428 convey signals directly from respective stages 381 through 388 of the carry register 78 in FIG. 25. The final product generated by adding the sum and carry signals in the carry propagate adder 100 in FIG. 2 is represented by signals on the conductors of the cable 108. The signals of the conductor of the cable 108 are passed by a set of gates 106 to output conductors in a cable 110 whenever the line 112 is energized with a positive signal. The gates 106 in FIG. 2 are like the set of gates on the output of the sum register 72 in FIG. 23, for example, and therefore are not shown in detail. The final product represented by signals on the conductors of the cable 110 in FIG. 2 may be conveyed to any desired load device.

Referring back to FIGS. 6 and 7, the multiplicand multiples generator 18 in FIG. 6 receives signals representative of the selected multiplicand multiple from the multiplicand register 10 or the 3× multiplicand register 14 in FIG. 4, and in addition, receives either a positive or negative signal on the True/Complement line 46. If the line 46 has a positive signal, this indicates that the multiple from the multiplicand multiples generator 18 is a negative value which should be in complement form, and accordingly the multiplicant multiples generator supplies the complement of the selected multiple as signals on the lines 621 through 631. If the line 46 in FIG. 6 is negative, this indicates that the selected multiple is a positive value which should be in true form and the multiplicand multiples generator 18 supplies signals representative of the true number of the selected multiple on the output lines 621 through 631. The line 46 in FIG. 6 is connected as an input to the adders 231 through 239 of the carry save adder 68 in FIGS. 6 and 7 the second input which is duplicated in each of adders 231 through 239 is applied on line 635. To facilitate a description and an understanding of the instant invention, a square matrix of carry save adders has been illustrated and described, although it will be obvious in practice that many of the adders so illustrated could be readily deleted and do not in fact function as part of the present invention. In like manner, the True/Complement lines 56 and 66 applied to multiplicand multiples generators 19 and 20 indicate whether the selected multiple from the multiplicand multiples generator is a negative value which should be in complement form or a positive value which should be in true form and supply signals representative of the true or complement of the selected multiple on the output lines 641 through 651 and 661 through 671 respectively. The true or complement information on line 56 is applied to adders 251 through 253 and 266 through 269 of carry save adder 69 in FIGS. 11 and 12. Likewise the true or complement line 66 is applied to adders 281 through 286, 298 and 299 of carry save adders 70 in FIGS. 16 and 17. Thus the multiplicand multiples generators 19 and 20 are operated in like fashion to multiplicand multiples generator 18 to supply the selected multiple for the corresponding higher order bits of the multiplier to the respective associated carry save adders.

Figure 27:
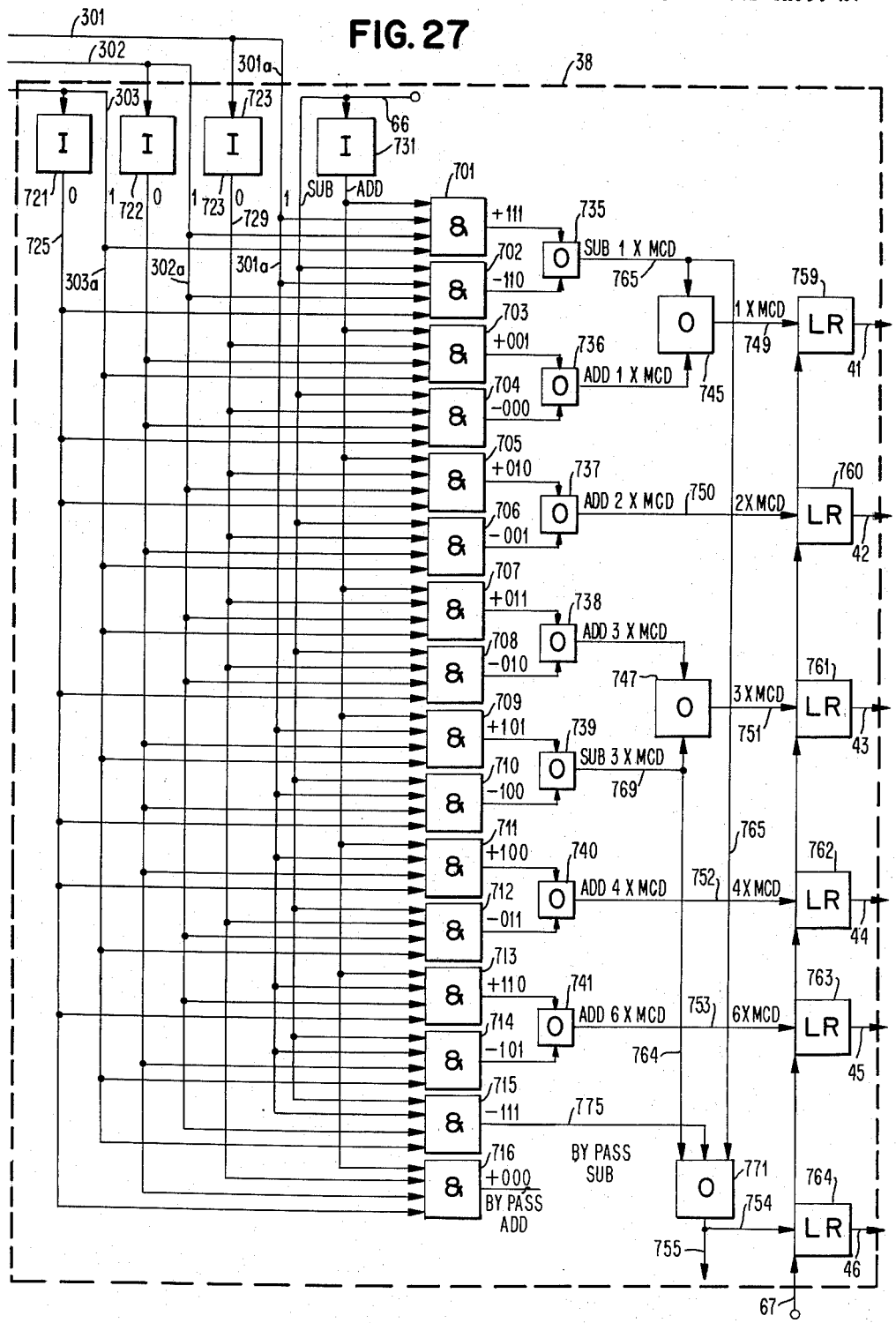
FIG. 27 illustrates in detail the logical circuits employed in the multiplier multiples decoders shown in block form in FIG. 1.
Figure 28:
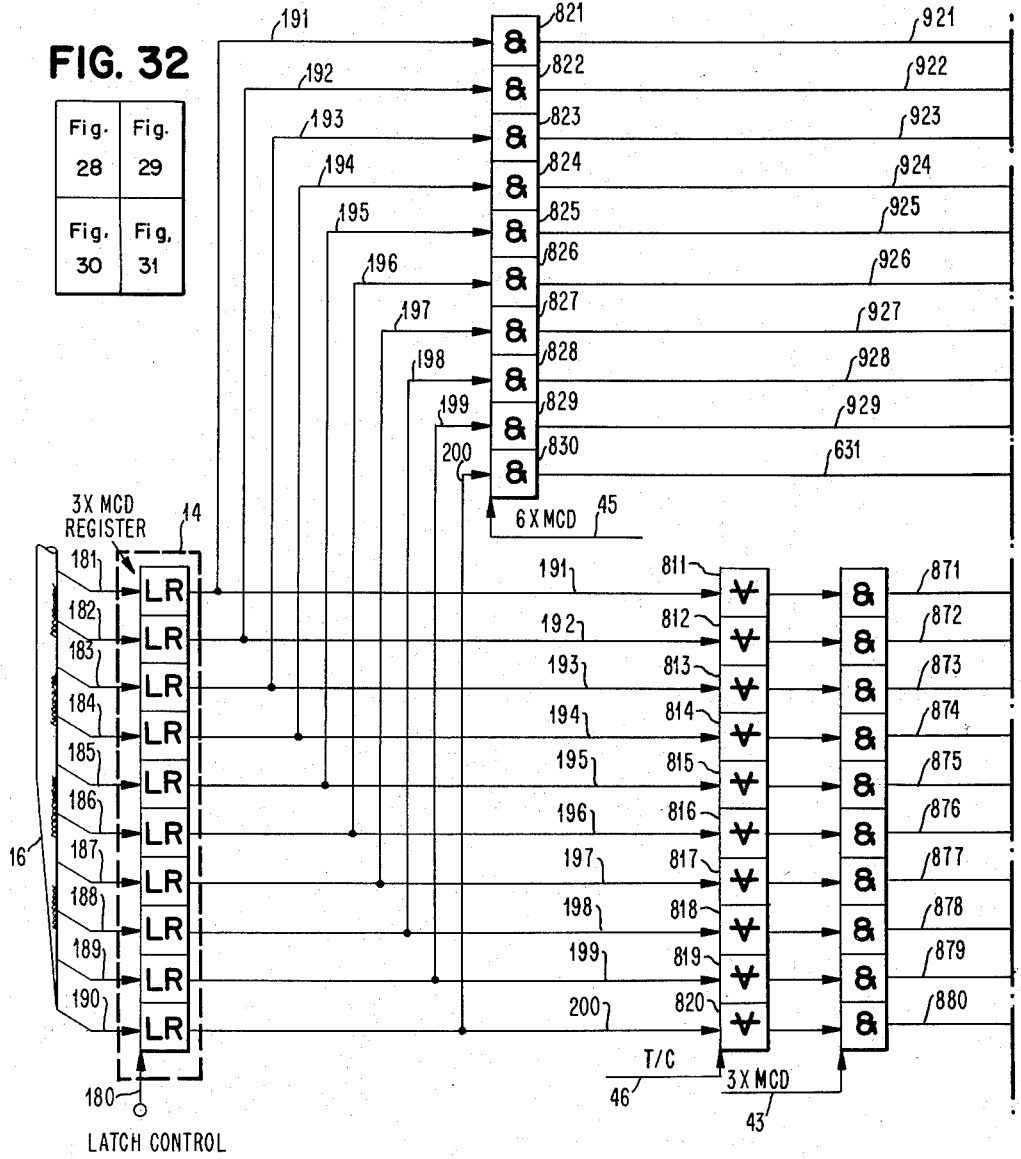
FIG. 28 through 31 illustrates in detail the logical circuits employed in the multiplicand multiples generators shown in block form in FIG. 1.
Figure 29:
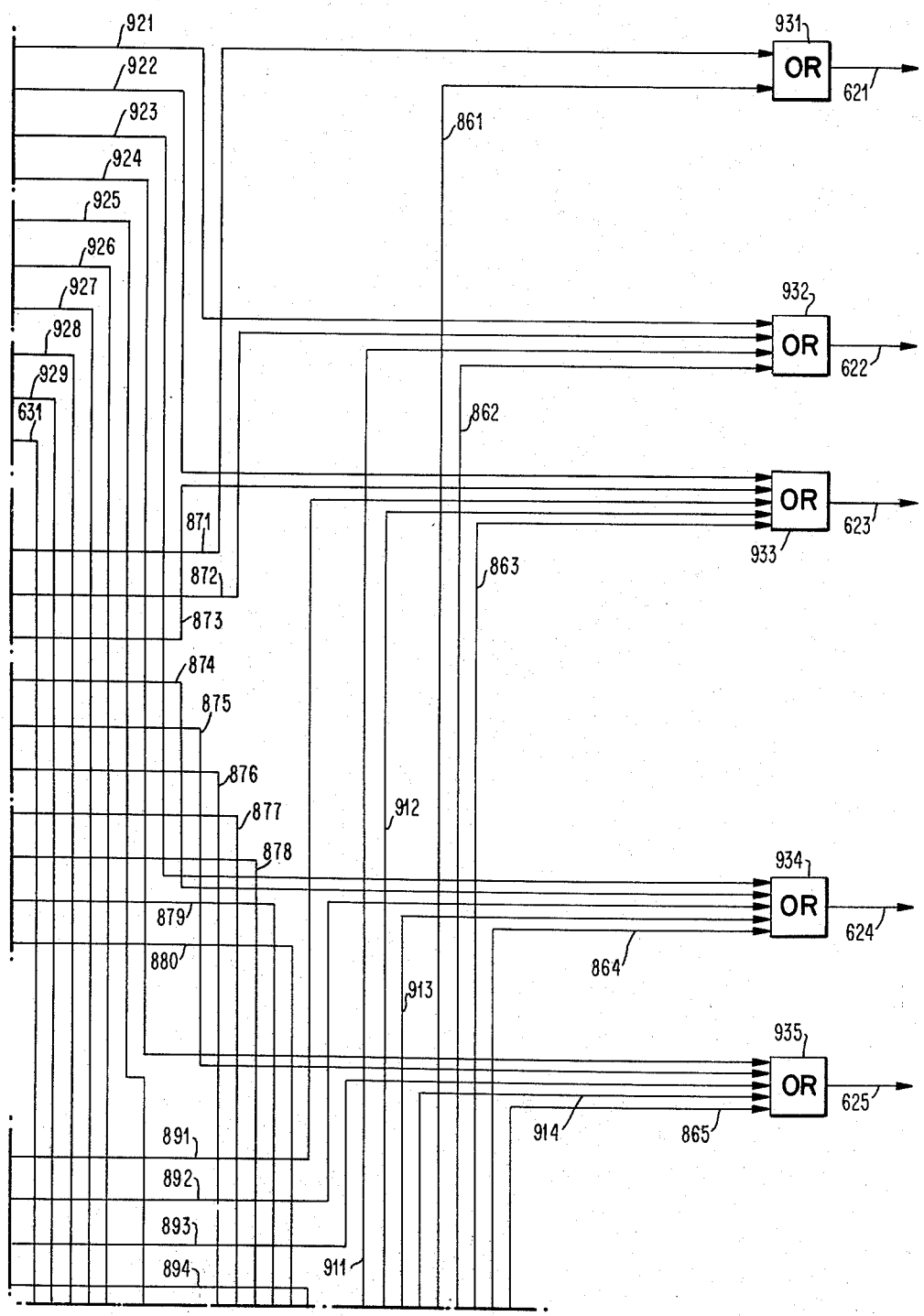
Figure 30:
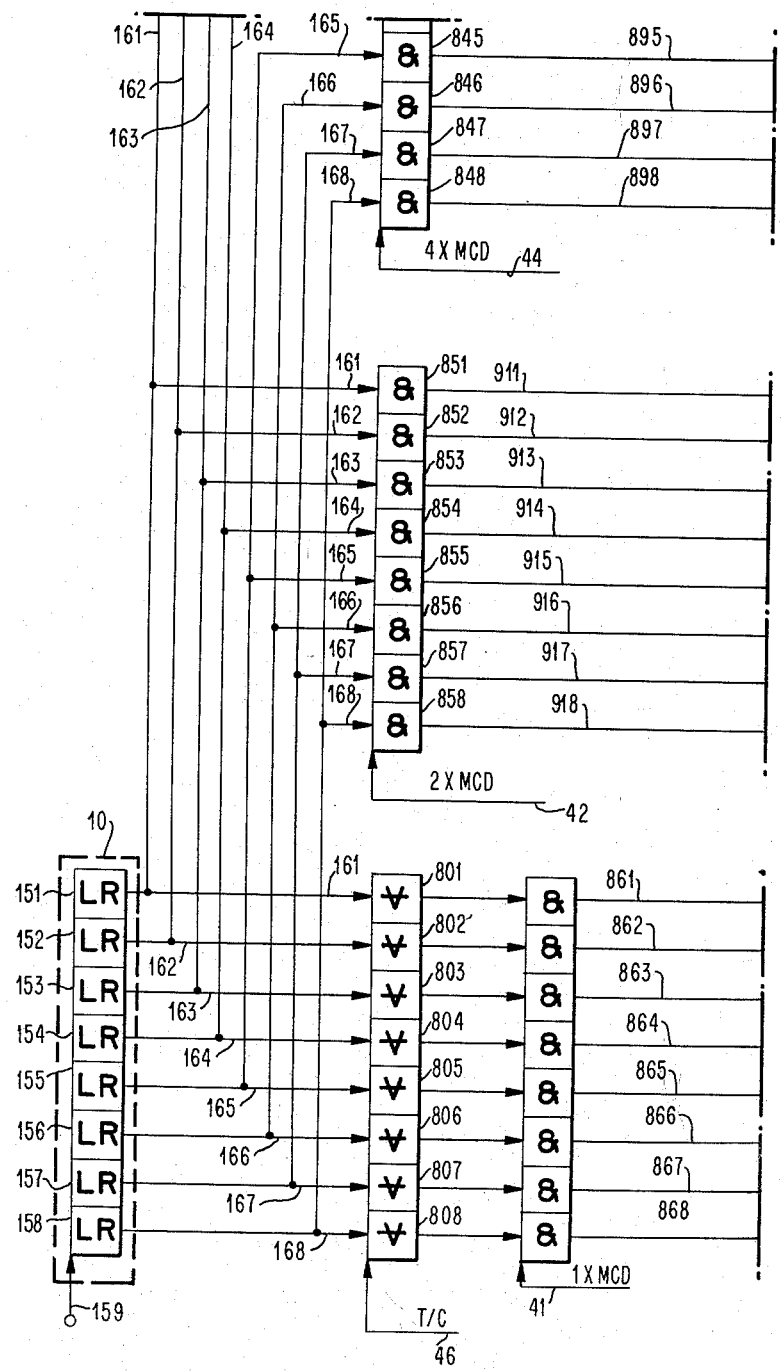
Figure 31:
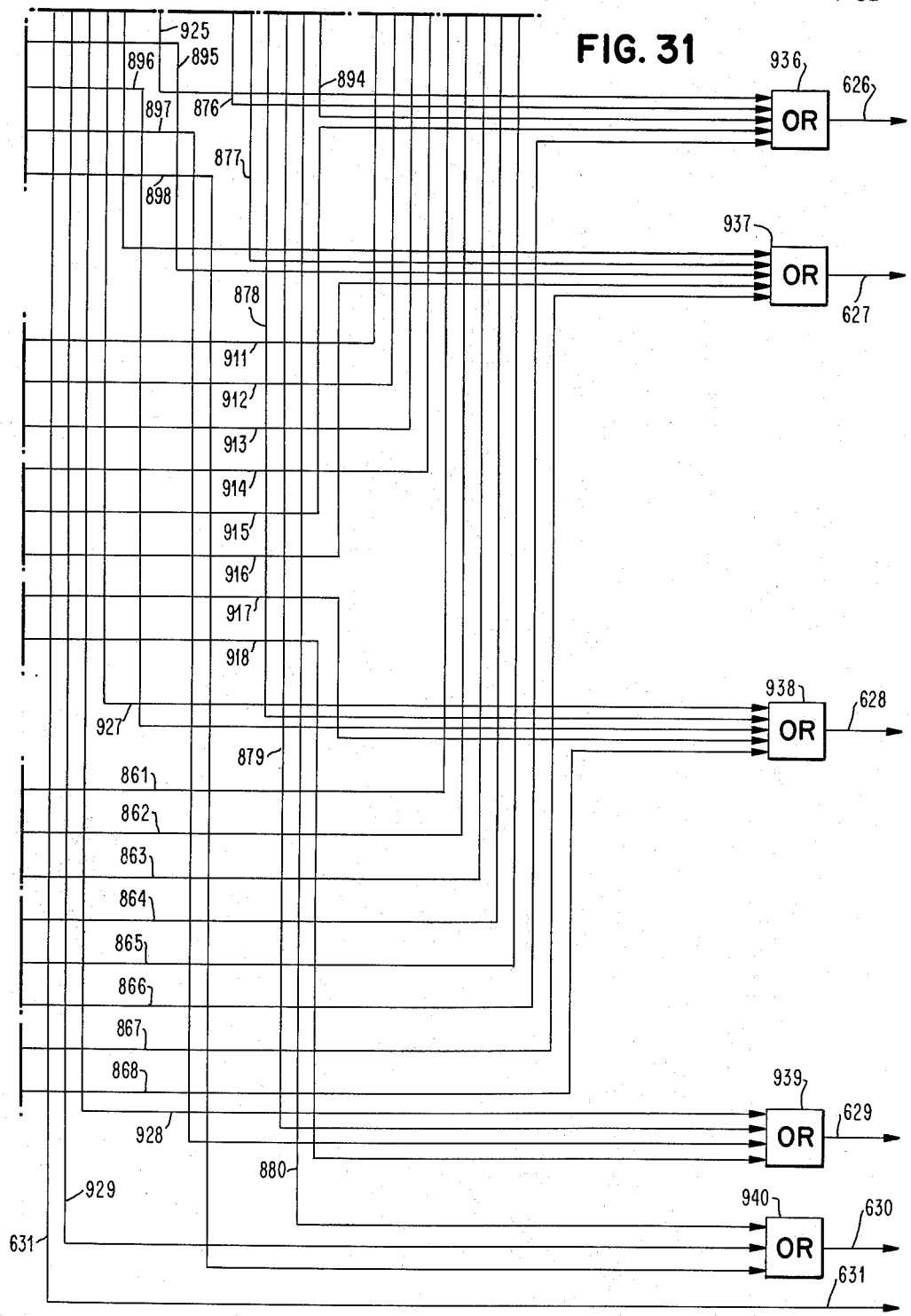

Reference is made to FIG. 27 for a detailed description of multiplier multiples decoder 38, and it will be appreciated that multiplier multiples decoders 39 and 40 are identical to decoder 38, except as hereinafter noted. The lines 301, 302 and 303 from respective stages 1 through 3 of the multiplier register 28 in FIG. 14 are connected as input lines to the multiplier multiples decoder 38 in the manner previously described. Multiplier multiples decoder 38 includes And circuits 701 through 716. The lines 301, 302 and 303 are connected to respective inverter circuits 721, 722 and 723 which in turn have respective output lines 725, 727 and 729 connected as illustrated. Inverter circuit 731, which is supplied by the latch register circuit associated with the group 3 true/complement line 66, employed to generate an add line on conductor 734, while line 66 is connected directly to supply the subtract line, since the selected multiple will be determined in part by whether the previous operation was add or subtract. The And circuits 701 through 716 are operated upon by signals on the lines 301 through 303, 725, 727, 729, 733 and 66. The outputs from inverter circuits 721 through 723 represent binary zero for the associated multiplier bit, while lines 301, 302 and 303 represent binary one for the associated multiplier bit. And circluits 701 through 716 are connected to associated Or circuits 735 through 742. Or circuits 735 and 736 are in turn connected through Or circuit 745, while Or circuits 738 and 739 are connected through Or circuit 747. The outputs from Or circuits 745 and 747 on lines 749 and 751 represent the multiplicand and 3× MCD respectively. The output of Or circuit 737 is connected to line 750, the output from Or circuit 740 connected to line 752, the output from Or circuit 741 connected to line 753 and the output of Or circuit 742 to line 754. Output lines 749 through 753 are in turn connected to respective latch register circuits 759 through 763 which in turn provide output signals on lines 41, 42, 43, 44 and 45 in response to a control signal applied to line 67. Depending on the particular combination of lines energized, the 1× MCD add or subtract may be generated, the 2× MCD selected, 3× MCD either add or subtract, the 4× MCD or the 6× MCD may be selected, or in case of bypass none will be selected. The signals on the line 66 determine whether the selected multiple from the multiplier multiples decoder 38 is to be in true or complement form. If the output line 46 is positive, the selected multiple indicated by the lines 301 and 303 and 725, 727 and 729 is a negative number and should be represented in complement form. If the signal on line 46 is negative, the selected multiple indicated by the input lines is a positive number and should be represented in true form.

The manner in which a specific multiple is selected by the multiplier multiples decoder 38 may be understood by referring more specifically to the And circuits 701 through 716. Whenever one of And circuits 701 through 704 are selected, the one multiple of MCD is selected, the output from And circuits 701 and 702 indicating a subtract MCD, the outputs from And circuits 703 and 704 indicating an add MCD for the particular add or subtract combination depending on the previous operation indicated by the signals on lines 46 and 734. Whenever And circuits 705 or 706 are selected, the multiple of 2× MCD is selected. Whenever one of And circuits 707 through 710 are selected, the output of 3× MCD is selected, the output from And circuits 707 and 708 identifying the add 3× MCD, the output from And circuits 709 and 710 identifying the subtract 3× MCD. In like manner the output from the remaining And circuits indicates the selected multiplicand multiple. The And circuits 701 through 716 are selected in response to a positive signal applied to each of the inputs, and each of these And circuits has a different combination of the 4 input lines. The output from Or circuits 735 and 739 on lines 765 and 769 are applied to Or circuit 771 along with line 775 from And circuit 715, the output on line 754 indicating that the preceding operation was subtract. In the group 3 multiplier multiples decoder 40, the group 3 true/complement line 66 is connected as the input to inverter 731, while the output line 755 from Or circuit 754 is connected as the input to the group 2 inverter corresponding to inverter 731 in FIG. 27, provides the indication of whether the preceding operation was add or subtract.

Except for the above difference, the multiplier multiples decoders 39 and 40 are identical to multiplier multiple decoder 38. The output of the Or circuit in decoder 39 corresponding to line 755 is connected to the input of the group 3 inverter corresponding to inverter 731. Since the logic on which each of the multiplier multiples decoders in the multiplier arrangement under discussion operates on three bit groups, an extra zero or zeros will be added to the higher order end of the multiplier to produce an even multiple of three whenever the number of multiplier bits does not correspond to an exact multiple of three. Each three bit group of the multiplier is supplied to a multiplier multiples decoder. The number of decoders employed may be one or more. In the instant illustration three multiplier multiples decoders have been arbitrarily selected. Once the number of multiplier multiples decoders has been arbitrarily selected, there must be at least as many carry save adder inputs employed as there are such decoders used. Once the number of multiplier multiples decoders is fixed, the number of add operations required to perform a multiply operation becomes fixed, and it may be determined by dividing the number of bits in the multiplier by three times the number of multiplier multiples decoders, with an extra cycle being allowed where the last operation is a subtract. For purposes of discussion at this point the term addition refers to the insertion of a positive number in a carry save adder and the term subtraction refers to the insertion of a complement number in a carry save adder. Accordingly, one addition or one subtraction is made for each multiplier multiples decoder during a given add cycle. The term add operation at this point in the discussion refers to the totalization of various multiples simultaneously in the various carry save adders whereby signals representative of a sum and signals representative of a carry are supplied to respective sum and carry registers. By using the low order position or bit in each three bit multiplier group as a reference, the 2× and 4× MCD multiples may be generated by shifting one or two positions left from the reference position. The 3× MCD multiple is derived directly from the three times MCD register 14, and the 6× MCD is generated by shifting this value one position to the left. The general rule is that following any addition or subtraction, the resulting partial product will be either correct or smaller than it should be by an amount equal to 8× MCD which is corrected in the final operation.

Figure 7:
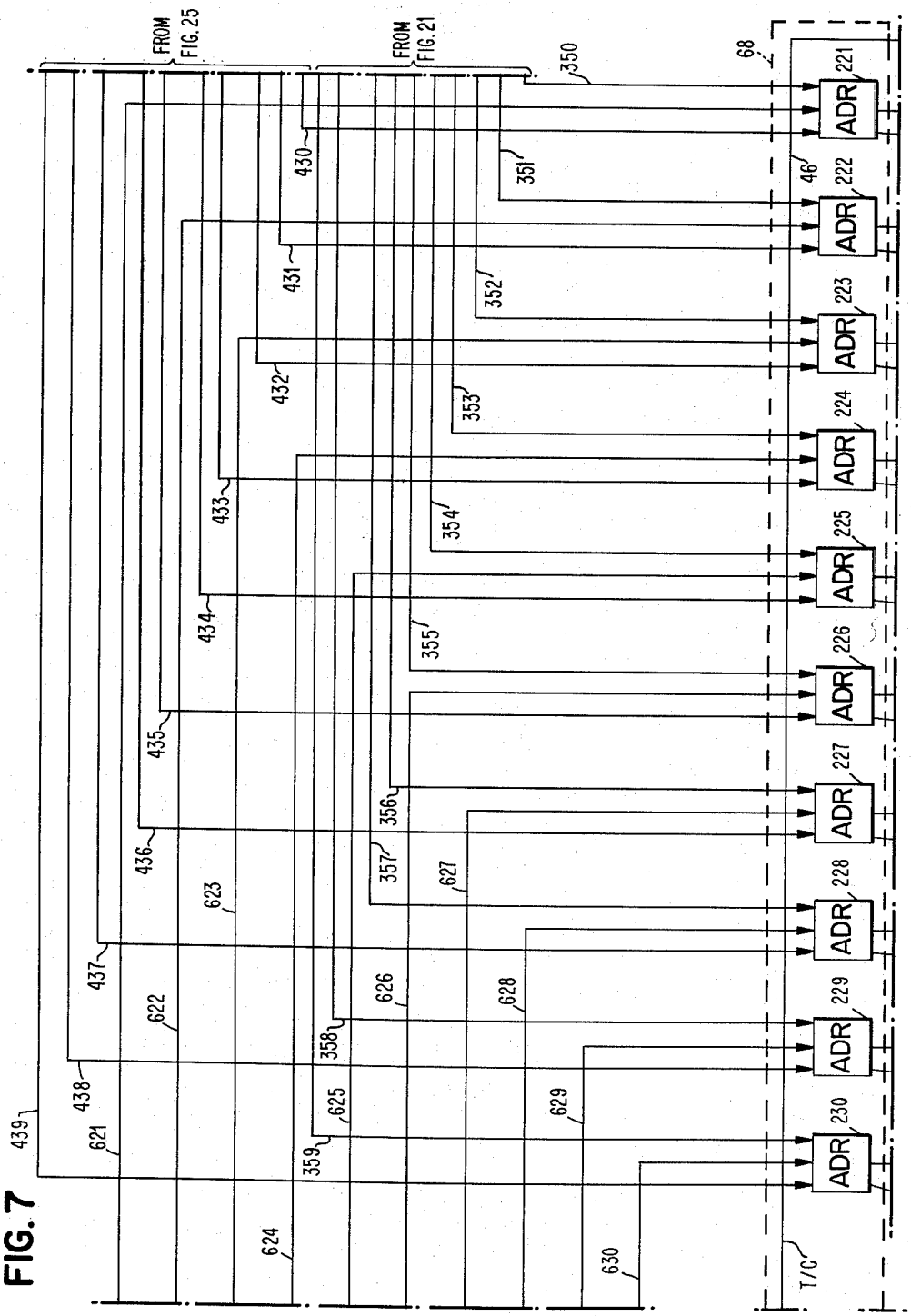
Figure 8:
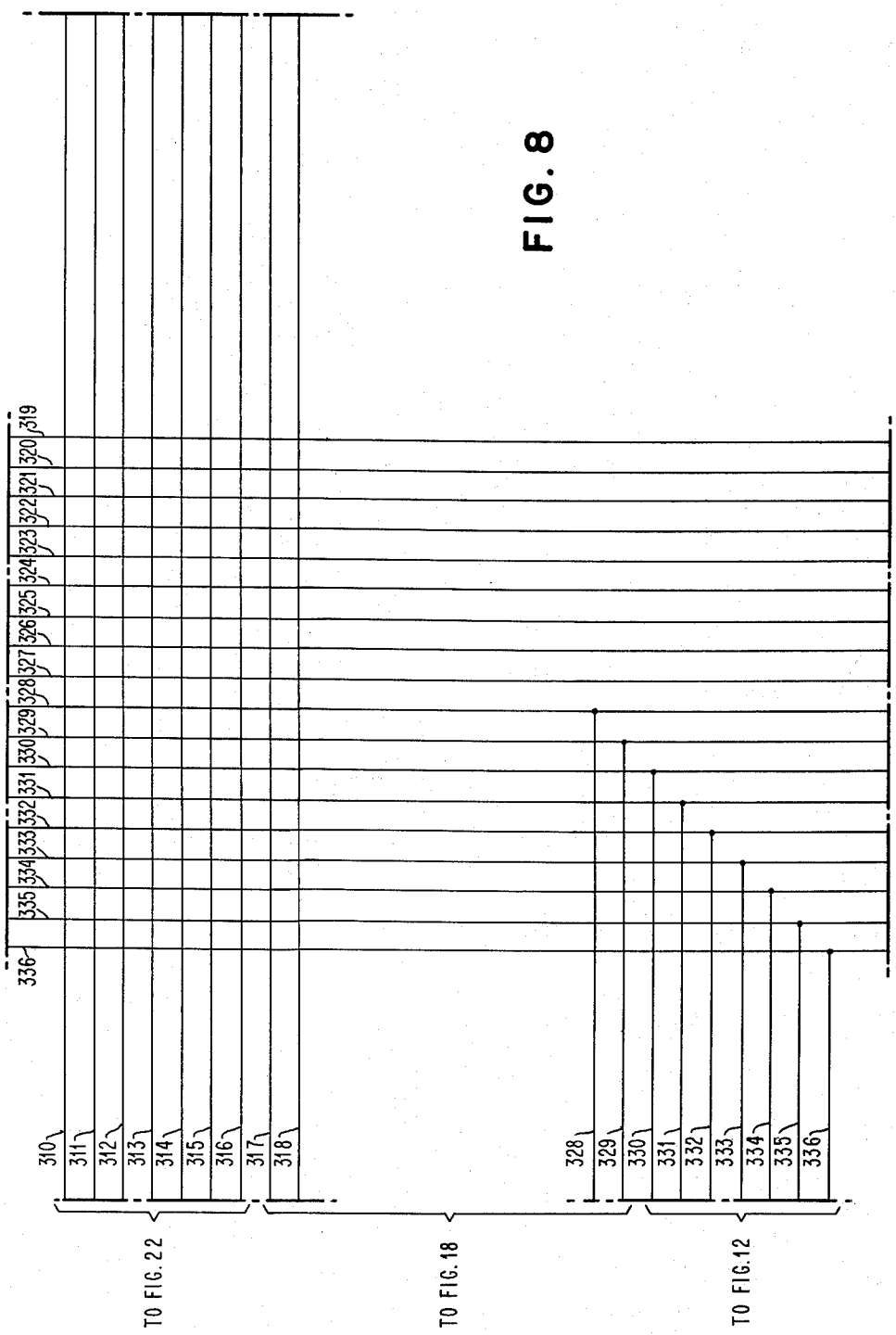
Figure 9:
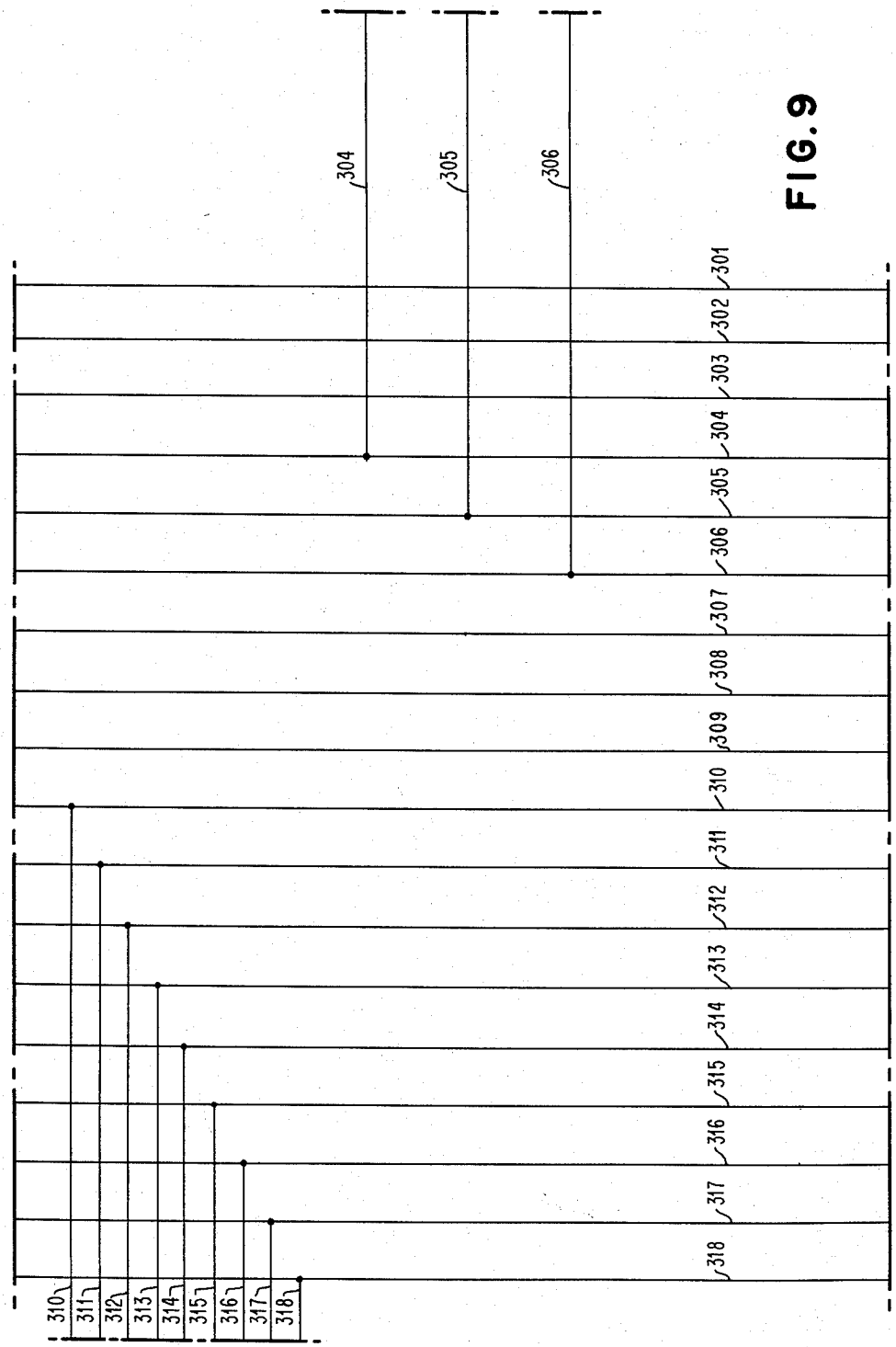
Figure 10:
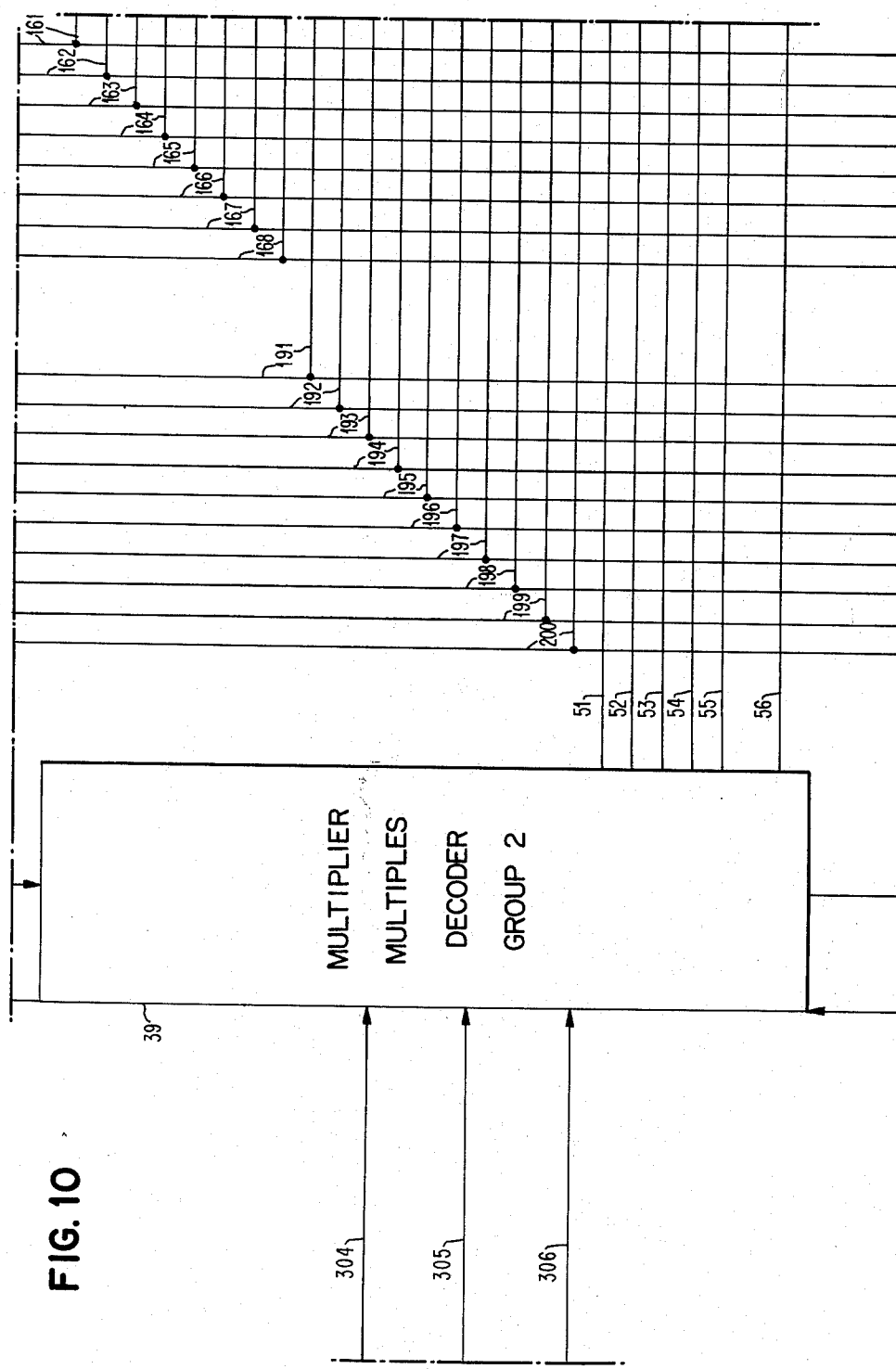

The multiplicand multiples generator 18 listed in block form in FIGS. 1 and 7 is illustrated in detail in FIGS. 28 through 31 interconnected as shown in FIG. 32. The multiplicand multiples generator functions to provide signals representative of the selected multiple of the mutliplicand in accordance with the signal selected by the associated multiplier multiples decoder 38, the one and three multiples being provided in either true or complement form. After the latch control line 159 is energized with a positive signal, signals representative of the multiplicand are read out from the multiplicand register 10 on lines 161 through 168 to exclusive Or circuits 801 through 808. After latch control line 180 is energized, signals representative of 3× multiplicand are read out from the 3× MCD register 14 on lines 191 through 200 to exclusive Or circuits 811 through 820. In addition, the signals on lines 191 through 200 are also applied to And circuits 821 through 830. Lines 161 through 168 from MCD register 10 are also applied to And circuits 841 through 848 and 851 through 858 respectively. As heretofore described, output lines 621 through 631 in the group 1 multiplicand multiples generator 18 are connected as one of the inputs to carry save adder circuits 221 through 231, the right most adder circuit 21 being the least significant digit and the digits 221 through 231 being connected in a rising binary sequence.

Exclusive Or circuits 801 through 808 receive signals representative of the multiplicand on the lines 161 through 168. When the true complement line 46 is energized with a positive signal, exclusive Or circuits 801 through 808 operate to provide the complement of the multiplicand on output lines 861 through 868, and when line 46 is energized with a negative signal, exclusive Or circuits 801 through 808 are operated to provide signals representative of the multiple in true form. Likewise, after a latch control signal is applied to line 180, signals representative of the three times MCD are applied via conductors 191 through 200 to exclusive Or circuits 811 through 820. When the line 46 is energized with a positive signal, exclusive Or circuits 811 through 820 are operated to provide the complement of the 3× MCD on output lines 871 through 880; when line 46 is energized with a negative signal, exclusive Or circuits 811 through 820 are operated to provide signals representative of the 3× MCD in true form on conductors 871 through 880. When line 159 is energized by a positive signal, And circuits 841 through 848 are conditioned to pass positive signals on lines 891 through 898 provided these And circuits are conditioned by a positive signal on line 44 representing four times MCD. And circuits 851 through 858 are also conditioned by the output from MCD register 10 to pass signals on output lines 911 through 918 providing these And circuits are conditioned by a positive signal on line 42 representing 2× MCD. Finally, And circuits 821 through 830 are conditioned by the output of 3× MCD register 14 to pass positive signals on lines 921 through 930 provided the And circuits are conditioned by a positive signal on line 45 representing 6× MCD. It is noted from FIGS. 28 through 31 that the outputs from exclusive Or circuits 801 through 808 and 811 through 820 representing one and three times MCD in true and complement form as well as the outputs from And circuits 851 through 858 representing two times MCD, 841 through 848 representing four times MCD and 821 through 830 representing six times MCD are applied to various combinations of Or circuits 931 through 940 respectively. Referring briefly back to FIGS. 6 and 7, it is noted that the output lines 621 through 631 are applied to carry save adders 221 through 231 respectively, carry save adder 221 representing the $2^0$ order, carry save adder 222 the $2^1$ order and so forth and carry save adder 231 the $2^{10}$ order. Since the multiplicand in the assumed embodiment herein described is an eight bit arrangement, output lines 861 through 868 comprising the eight lowest order bits reapplied through Or circuits 931 through 938 and via output lines 621 through 628 to carry save adders 221 through 228 respectively. Output lines 911 through 918 which constitute the 2× MCD in reality comprises the one times MCD shifted one place to the left and accordingly are applied through Or circuits 932 through 939 to carry save adders 222 through 229 respectively. The output on lines 891 through 898 comprising the 4× MCD is the one times MCD shifted two positions to the left and accordingly is applied to Or circuits 933 through 940 to output lines 623 through 630 to carry save adders 223 through 230 respectively. The output from exclusive Or circuits 811 through 820 representing the three times MCD in true or complement form is applied via Or circuits 931 through 940 and output lines 621 through 630 to carry save adders 221 through 230 respectively. The output representing 6× MCD on output lines 921 through 930 effectively comprises the 3× MCD multiple shifted one position to the left and accordingly is applied via Or circuits 932 through 940 to output lines 622 through 630 and applied directly from the output of And circuit 830 to output line 631. Thus essentially from the one and three times MCD registers, the multiples of one and three true or complement form as well as the two, four and six times MCD multiples are selected. As will be evident from the preceding description, the shifting necessary to generate certain of the multiples is accomplished by shifting the relative entry position of the 1 or 3× MCD multiple into the associated carry save adders 68 in FIGS. 6 and 7. The lowest order adder position 221 only receives outputs on line 621 or lines 861 or 871 representing the lowest order bit of the 1 or 3× MCD multiple. Signals on the lines 622 through 631 are connected to respective adders 222 through 231 respectively. Thus it is seen that signals on the lines 621 through 628 representing multiplicand, when shifted one position to the left into adders 222 through 229, forms the 2× MCD multiple and when shifted two positions to the left into adders 223 through 230 constitutes the 4× MCD multiple. As previously indicated, the five and seven MCD multiples are generated by utilizing the three and one complement outputs and effectively adding eight MCD in the following operation. It is pointed out that when the selected one and three times multiple into carry save adder 68 is a true number, the true complement line 46 is negative and inserts zeros into the associated adder positions; when the selected multiple is in complement form, the signal on line 46 is positive and this inserts binary ones into the corresponding adder positions. The And circuits, Or circuits, exclusive Or circuits and Inverter circuits employed in the multiplicand multiples generator arrangement of this invention may be any one of various suitable types, and a detailed consideration of them is not considered necessary since they are so widely known.

Figure 33:
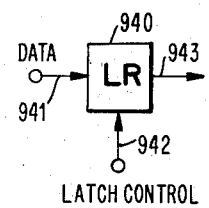
FIG. 33 illustrates in block form a latch register circuit.
Figure 34:
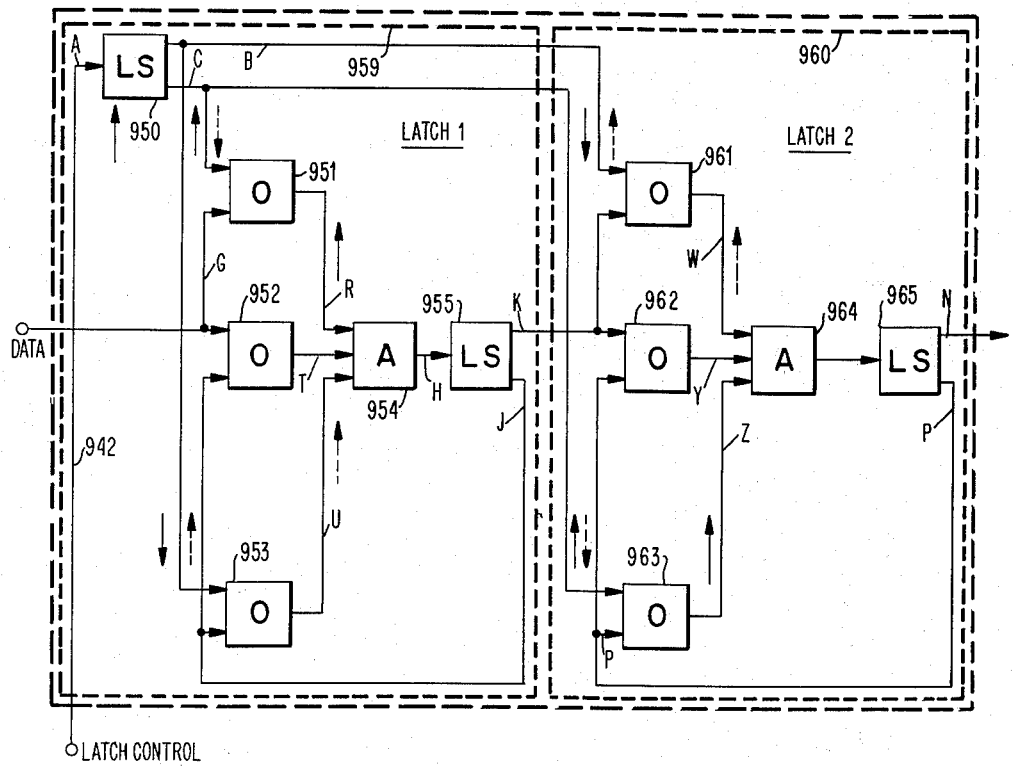
FIG. 34 illustrates in detail the logic circuits employed in the latch register circuit of FIG. 33.

Reference is made to FIGS. 33 and 34 for a detailed discussion of the latch register circuits employed throughout the various figures of the drawings. A latch register is a device having two inputs, a data signal input and a latch control input. The latch register accepts information at the time the latch control signal changes from a de-energized condition to an energized condition. For this purpose the signal input must maintain its desired condition for a relatively small interval of time immediately preceding, during and following the application of the latch control signal, this interval being measurable in terms of circuit transition time. At all other times, regardless of whether the latch signal is energized or de-energized, the output from the latch register is not controlled by the state of the data input signal which may be changed at will.

The latch register circuit illustrated in block form in FIG. 33 and shown in detail in FIG. 34 includes circuits 950 through 955 which constitute a first latch 959 and circuits 961 through 965 which constitute a second latch 960. By "latch" is meant a circuit having a control input and a data input, the output of which will follow the data input when the control input is de-energized. When the control input is energized however, the output will remain constant at the condition it had when the control input changed, regardless of any changes of input signal during this time.

FIG. 34 shows a basic latch register circuit. It consists of two identical latch circuits designated latch 1 and latch 2, connected in series; that is, the output of the first latch circuit 959 is connected as the input to the second latch circuit 960. The latch control signals are connected in opposition; that is, when the first latch is locked, the second latch is free and when the second latch is locked, the first latch is free.

In the illustration the And and Or circuits are assumed to be constructed of diodes, and the level setters (LS) are made from transistors. The signal on the lower output line from the level setter 950 designated C has the same polarity as that of the latch control signal on the line 942 designated A while the polarity of the signal on the upper output line designated B is opposite to the polarity of the signal on the input line 942. For purposes of this description, the transit time through one level setter is considered to represent one unit of time, while the transit time through the diode And and Or circuits is assumed zero. The logic is assumed to be positive. In order to illustrate the operation of the latch register circuit 940 in FIG. 34, various points in the circuit are designated by different letters of the alphabet, and signals at these points change their potential in a manner indicated in FIG. 35. When the latch control signal on the line 942 is negative, the latch one (959) is free and the latch two (960) is locked. The dashed arrows indicate the polarity of the signal level at the various points indicated as determined by the latch control signal at A being negative. The point C being positive causes the output of the Or circuit 953 to be positive thereby making U positive. This leaves points R and T to determine the condition H. Since B is negative, R is controlled only by G, so R is positive when G is positive and R is negative when G is negative. T is controlled by J, O, R and G. If G is positive, T is positive. If G is negative, J will be negative because H is negative. H is negative because R is negative and R is negative because G is negative. Therefore T will be negative since both G and J are negative when G alone is negative. Therefore the potential H will follow the potential at G and the potential at J will follow the potential at H, though the changes at J will lag one unit of time behind the corresponding changes at H. When the control signal at A is negative, the latch one (959) is locked and the latch two (960) is free. The solid arrows indicate the polarity of the signal level at the various points indicated as determined by the control signal at A being positive. In this case the condition of the signals at points J and K will not change even though the signals at G do change. Since the signal at B is positive, the signal at R will remain positive. The signal at T will be positive if the signal at J is positive, though the signal at T will not necessarily be negative if G is negative. Since the signal at C is negative, the signal at U is controlled only by the condition of the signal at J. Therefore, if the signal at J is positive, it will be held positive by the feedback through the points U and T. If the signal at J is negative, there is no path by which the signal G can bring the signal level at U positive.

In order to set a signal into the latch register, the data signal at G must be held at its desired condition sufficiently long in advance of changing the signal at B and C for the signal at J to have acquired the same condition as the signal at G. Latch two (960) operates in the same manner as latch 959 except that its input is the signal level at K rather than the signal level at G, and the connections of the input lines of the level setter 950 have been reversed. Note that the signals at B and C have been inverted in latch two when compared with latch one. FIG. 35 shows a sequence time chart from which it may be seen that although the latch control signal A locks latch two at the same time it frees latch one, the change in the output latch one does not occur until one unit of time later which allows sufficient time for the locking action of latch two to be completed. An overlap must be maintained here to assure reliable operation.

The use of the signal level at K as an input to the latch two is selected to make the level at N which has no other load on it agree with the signal level at G. This also reduces the effective skew between B and C. However, if desired, the signal level at J could be used as the input to the latch two as well as for feedback. If this were done, the signal level at P would be set to agree with the signal level at G, and P instead of N would be used as the output.

The level setters (LS) illustrated in block form in FIG. 34 may be any one of various suitable types, and one suitable arrangement is illustrated in detail in FIG. 36. The level setter 970 in FIG. 36 includes transistors 971 and 972 connected as shown. When a signal is applied to an input line 973 of one polarity, a signal of the same polarity appears on an output line 974. The output line 975 has a signal the polarity of which is opposite to the polarity of the signal on the output line 974.

Figure 37:
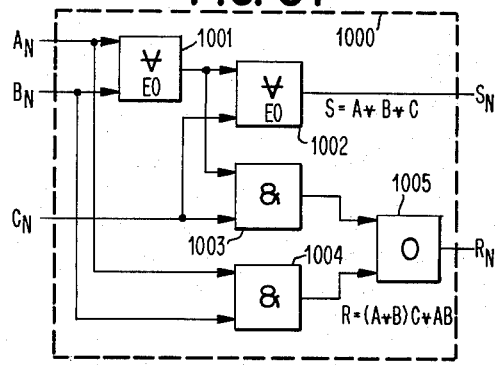
FIG. 37 illustrates in block logic form a carry save adder circuit.

In operation a positive signal applied to the input line 973 causes the transistor 971 to conduct and the transistor 972 to be non-conductive. Accordingly, the potential at the output line 974 approaches a value of approximately positive six volts. If the signal level of approximately zero volts is applied to the input line 973, the transistor 971 becomes non-conductive and the transistor 972 becomes conductive. Consequently, the potential at the output line 974 approaches ground or zero level. A zero level is more negative than the positive 6 volt level, and the zero level is accordingly referred to as a down or negative level. The level setter 970 serves to accept signal levels on the input line 973 which vary within limits around plus 6 volts or zero volts and provide output signals on the line 974 which are fixed and operative within certain precise limits. When a signal on the output line 974 is 6 volts positive, a signal on the output line 975 is approximately zero volts, and when the signal on the output line 974 is approximately zero volts, the signal on the output line 975 is approximately 6 volts positive. The adder circuts employed in the carry save adders of this multiplier arrangement may be any one of any suitable type, and one suitable adder circuit is illustrated in FIG. 37. It includes exclusive Or circuits 1001 and 1002, And circuits 1003 and 1004 and an Or circuit 1005 connected as shown. Three binary inputs to the adder are labeled $An$, $Bn$ and $Cn$. The outputs which represent a sum and carry from the addition of the quantities $An$, $Bn$ and $Cn$ are designated by the letters $Sn$ and $Rn$. A positive signal on the input lines represents a binary one, and a negative signal represents a binary zero. A positive signal on the output line $Sn$ represents a sum of one, and a positive signal on the output line $Rn$ represents a carry of one. Whenever $An$ and $Bn$ are unlike, the exclusive Or circuit 1001 supplies a positive signal to the exclusive Or circuit 1002. Whenever $An$ and $Bn$ are alike, the exclusive Or 1001 supplies a negative signal to exclusive Or 1002. Whenever the signal supplied by the exclusive Or circuit 1001 to the exclusive Or circuit 1002 is unlike $Cn$, a positive signal is supplied on the output line $Sn$ which represents a binary sum of one. For all conditions the output line $Sn$ is a significant signal representing a binary sum of zero. The exclusive Or circuit 1001 supplies a signal to the And circuit 1003. Whenever both of these lines are positive, the And circuit 1003 provides a positive signal through the Or circuit 1005 to the output line $Rn$. A positive signal on the line $Rn$ represents a carry of one. The lines $An$ and $Bn$ are connected to the And circuit 1004 which in turn is connected through the Or circuit 1005 to the output line $Rn$. Whenever both $An$ and $Bn$ are positive, the output line $Rn$ is rendered positive, thereby indicating a carry of one. When neither the And circuit 1003 nor 1004 provides a positive signal to the Or circuit 1005, a negative signal appears on the output line $Rn$ representing a carry of zero. Accordingly, the adder circuit 1000 responds to signals on the input lines $An$, $Bn$ and $Cn$ and provides signals on the output lines $Sn$ and $Rn$ representative of a sum and carry respectively. The carry propagate adder 100 illustrated in block form in FIGS. 1 and 2 is not shown in detail since it may be any suitable adder circuit wherein two numbers are added and the carries between stages are allowed to propagate through the various stages to provide a correct final sum.

Figure 22:
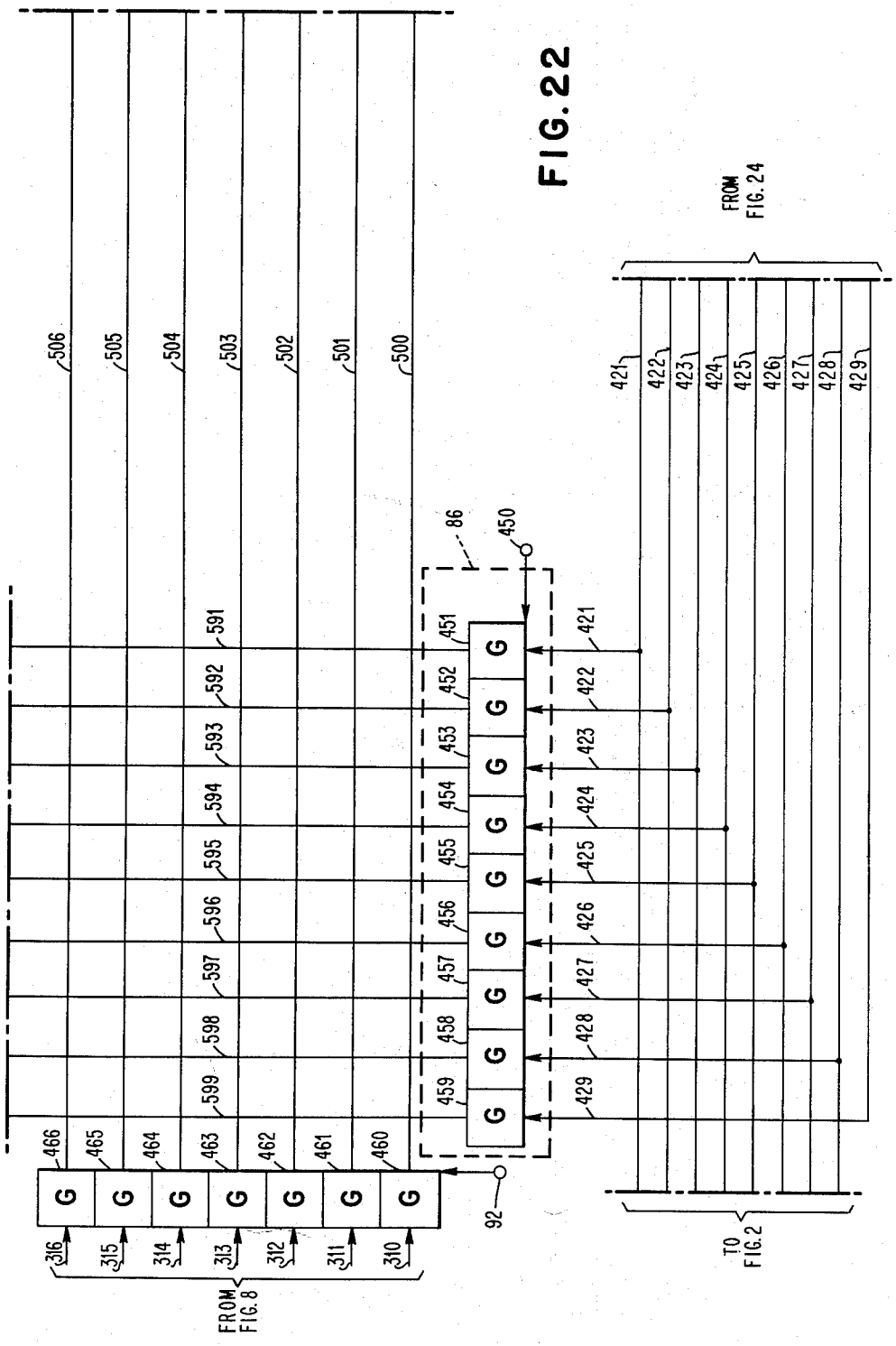
Figure 23:
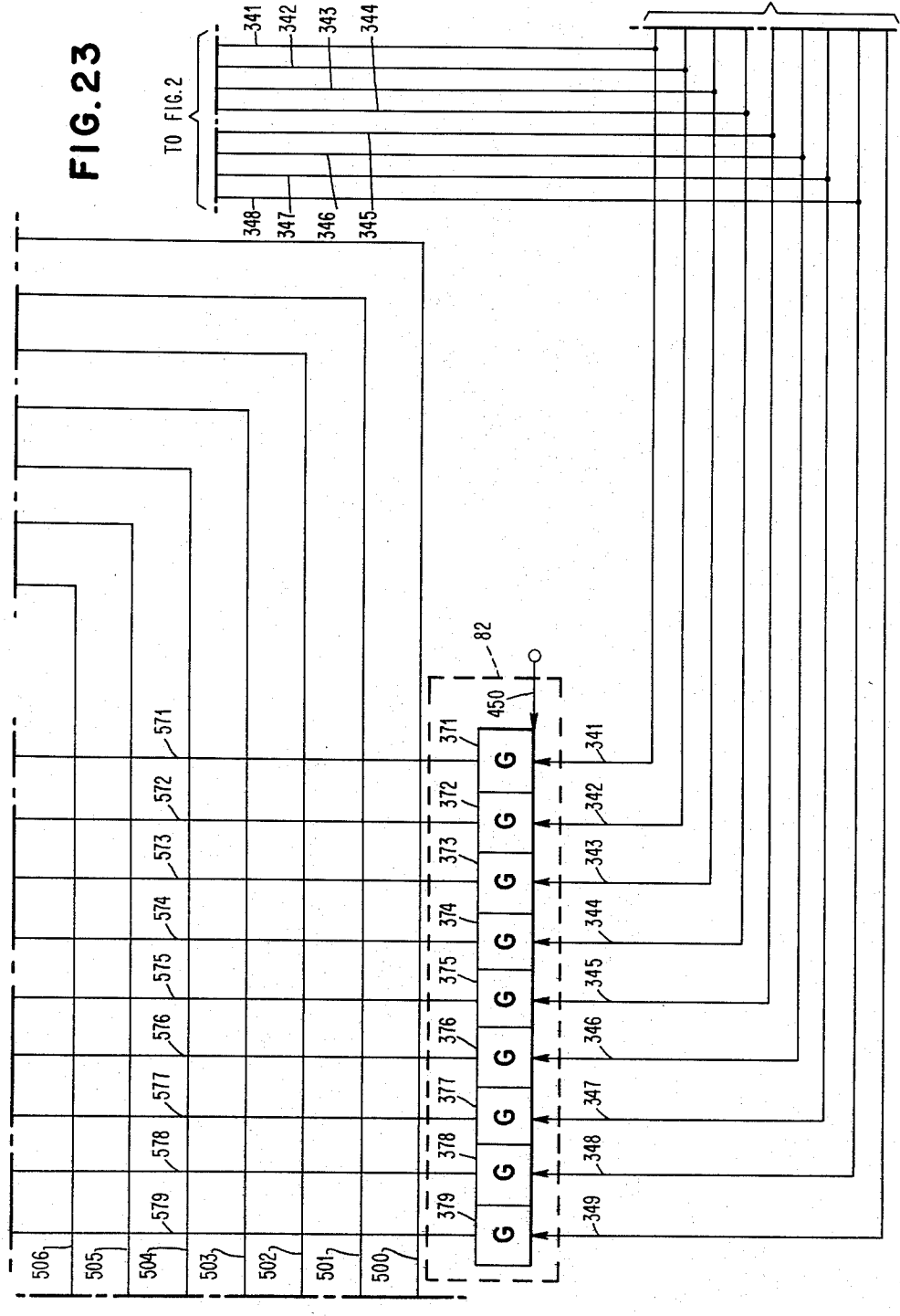

In the operation of the multiplier arrangement illustrated in FIGS. 2 through 25 the final product of two numbers is generated by a sequence of steps. The sequence of operations is summarized in the following steps or cycles:

*Step 1.*—Enter the multiplier in positions 1 through 18 of the multiplier register 28 in FIGS. 13 and 14, and enter zeros at positions 19 through 36 of this register. Enter the multiplicand in positions 1 through 8 of the multiplicand register 10 in FIG. 4, and enter the three times multiplicand into positions 1 through 10 of the $3 \times$ MCD register 14 in FIG. 4. The low order position of the multiplier, the multiplicand and three times the multiplicand registers are positioned in the rightmost stage which is stage number 1 in the respective registers. The line 92 to the shift gates 94 in FIGS. 13, 18 and 22 and the line 450 to the gates 82 in FIG. 23 and the gates 86 in FIG. 22 are energized with a positive signal, and these positive levels are maintained throughout the multiply operation. Clear the sum register 76 in FIGS. 20 and 21 and the carry register 78 in FIGS. 24 and 25. The operations thus far may be considered a preliminary cycle.

*Step 2.*—Energize the latch control line 67 in FIG. 14 with a positive pulse. As soon as the line 67 in FIG. 14 is made positive, signals on lines 301 through 309 from multiplier register 28 in FIG. 14 are applied to multiplier multiples decoders 38, 39 and 40 and stored in the latch register circuits of the decoders. When the positive pulse on the line 67 in FIG. 14 is generated, the single level on this line causes the signals earlier appearing on the input line of these latch circuits of multiplier multiples decoders 38, 39 and 40 to appear on the output lines 41 through 45, 51 through 55 and 61 through 65 respectively. The signals appearing on the input lines 41 through 45 together with the associated true/complement line 46 cause the multiplicand multiples generator 18 to supply the selected multiple of the multiplicand in true or complement form to associated carry save adders 68 in FIGS. 6 and 7. Likewise, the signals on the input lines 51 through 56 to the multiplicand multiples generator 19 and 61 through 66 of the multiplicand multiples generator 20 cause the multiplicand multiples generators 19 and 20 to supply the selected multiple of the multiplicand in true or complement form to associated carry save adders 69 and 70 in FIGS. 11, 12 and 16, 17 respectively. The positive pulse on the line 67 also causes the multiplier in positions 1 through 18 of the multiplier register 28 in FIGS. 13 and 14 to be shifted to the right nine stages, thereby discarding the nine lower order stages of the multiplier and bringing the next group of nine bits into stages 1 through 9 of the multiplier register so that they may be applied to the multiplier multiples decoders 38 through 40. After this nine position shift is completed, positions 10 through 36 of the multiplier register 28 in FIGS. 13 and 14 have zeros because positions 19 through 36 held zeros when the multiplier was initially set into positions 1 through 18 in step 1 above. Information in the latch register stages 321 through 329 of the sum register 76 in FIG. 21 passes via lines 341 through 349 to gate circuits 371 through 379 of sum gate circuits 72 in FIG. 23, from where they are applied to positions 10 through 18 of multiplier register 28 in FIG. 14. Likewise, information in latch register circuits 381 through 389 of carry register 78 in FIGS. 24 and 25 are applied via lines 421 through 429 to the carry gates 86 in FIG. 22 from where they are applied to stages 28 through 36 of the multiplier register in the next cycle. Information in the latch register stages 330 through 339 of the sum register 76 in FIGS. 20 and 21 and data from the latch register stages 390 through 399 of carry register 78 in FIGS. 24 and 25 is re-entered into the carry save adders 68 in FIGS. 6 and 7. However, this information from the sum and carry registers 76 and 78 is zeros at this time since the registers have been cleared in step 1 and this transfer takes place before an add operation in the carry save adders changes the outputs of these registers. Thus at the end of the second cycle, the first partial product has been generated and stored in the sum and carry registers and nine bits of the multiplier have been utilized.

*Step 3.*—After sufficient time has elapsed for the multiples of the multiplicand supplied to the carry save adders 68 through 70 to pass through all of the adder stages and generate the first partial product as sum signals on the lines 281*a* through 299*a* and carry signals on the lines 281*b* through 299*b* in FIGS. 16, 17; 21 and 24, 25, the line 67 in FIG. 14 is energized with another positive level. The positive signal on the line 67 in FIG. 14 sets the results of decoding the second set of nine bits of the multiplier into the multiplicand multiples generators 18, 19 and 20 from multiplier multiples decoders 38, 39 and 40 in FIGS. 5, 10 and 15, respectively; it shifts the multiplier nine positions to the right in the multiplier register 28 in FIGS. 13 and 14; it enters the data from the sum and carry registers 76 and 78 into positions 10 through 18 and 28 through 36 of the multiplier register 28 in FIGS. 13 and 14. Upon termination of the positive pulse on the line 67 in FIG. 14, the first partial product is stored in the sum and carry registers in FIGS. 20 and 21 and 24 and 25 respectively. Thus at the end of the third cycle, the 18 bit multiplier has been utilized, nine bits of sum and carry have been entered into respective stages 10–18 and 28–36 of the multiplier register and the second partial product is stored in the sum and carry registers.

*Step 4.*—After sufficient time has elapsed for the multiples of the multiplicand supplied to the carry save adders 68 through 70 and the re-entered portion of the sum and carry signals from the preceding partial product to pass through all of the adder stages and generate the second partial product as sum signals on lines 281*a* through 299*a* in FIGS. 16 and 17 and as carry signals on lines 281*b* through 299*b* in FIGS. 16 and 17, the line 67 in FIG. 14 is energized with another positive pulse. This pulse sets the results of decoding the next group of multiplier bits into the multiplicand multiples generators 18, 19 and 20 from multiplier multiples decoders 38, 39 and 40 respectively. Using the assumed 18 bit multiplier, however, the nine bits decoded in the cycle are zero's, which in the case of a preceding add operation merely constitutes a bypass. Where the last cycle was a subtract operation a +8 will be added automatically in this cycle in the manner heretofore described. The multiplier register is caused to shift 9 positions to the right whereby the sum and carry signals are shifted into positions 1–9 and 19–27 respectively. Simultaneously nine bits of sum and carry information from the sum and carry gates 82 and 86 are read into positions 10–18 and 28–36 thereby filling the multiplier register. Thus at the end of step 4, 18 bits of sum and 18 bits of carry are stored in the multiplier register 28, and the final eight high order bits of sum and carry are stored in respective sum and carry gates 82, 86.

*Step 5.*—The final step in the multiplication process uses the carry propagate adder 100 in FIG. 2 to generate the final product. In response to a suitable control signal applied to line 67, the contents of the multiplier register as well as 8 bits from the sum and carry gates are read into the carry propagate adder 100. While no provisions are disclosed in the illustrated embodiment to prevent the contents of the multiplier register and the sum and carry gates from reading into the carry propagate adder each time a positive signal is applied to line 67, this presents no problem using latch circuits since the output of the adder must be sampled at gates 106 to read out the product. In practice where it would prove desirable to utilize the carry propagate adder for other functions while the final sum and carry are being derived by the multiplier arrangement, suitable input gating to the adder could be provided in accordance with conventional computer practice. The final product derived in carry propagate adder 100 is available for readout from gates 106.

Figure 12:
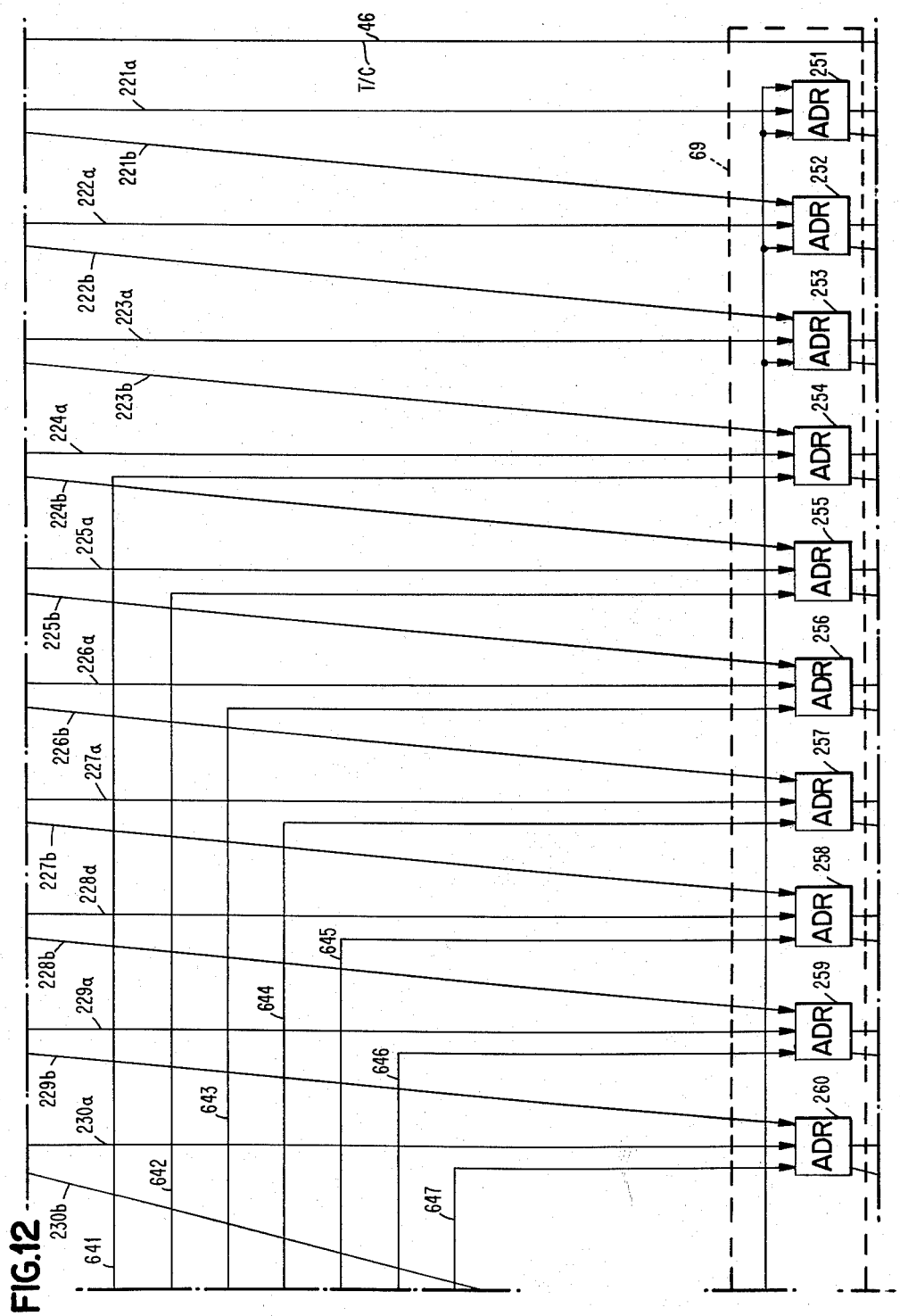
Figure 39:
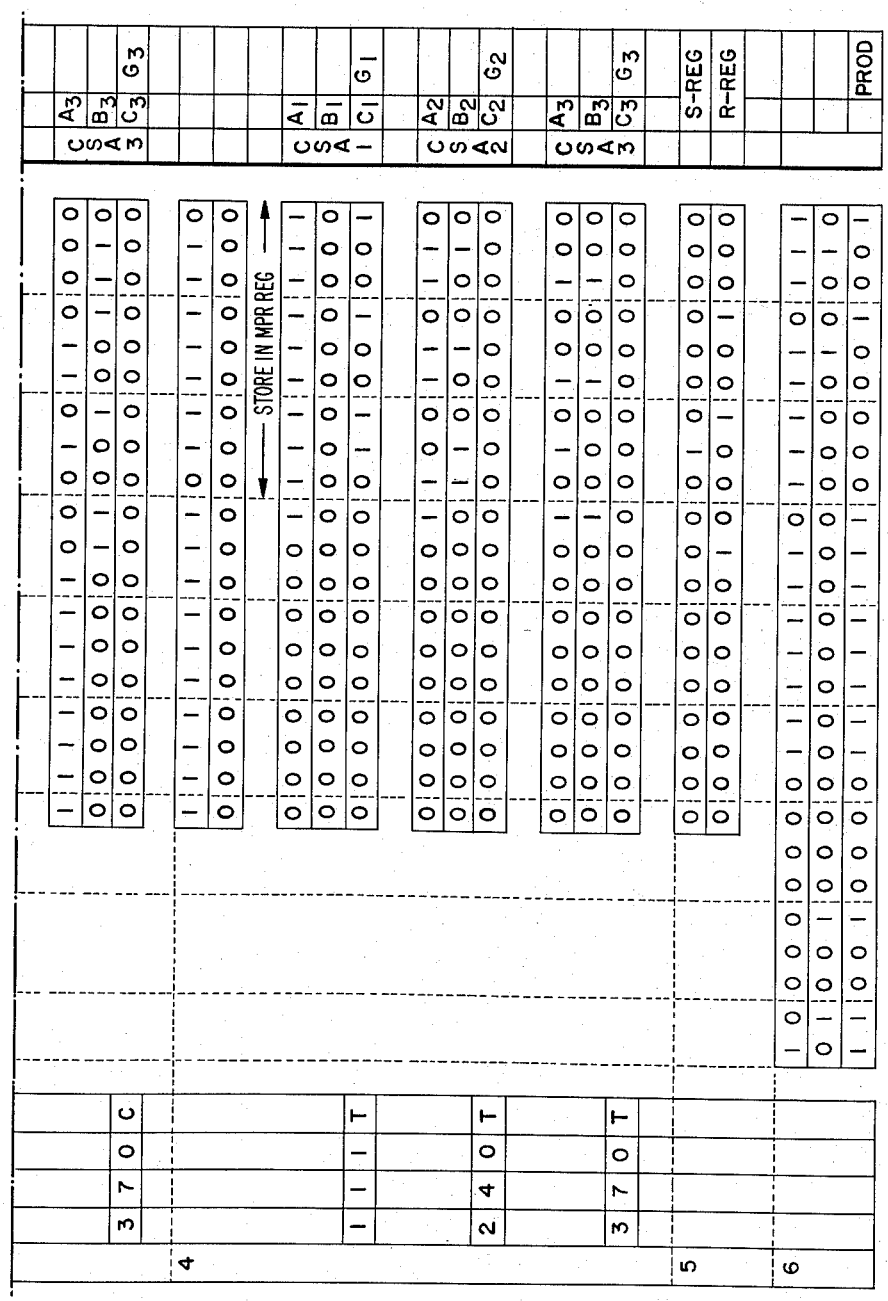

It is convenient at this point to examine in greater detail the operations which take place in the various parts of the multiplier arrangement illustrated in FIGS. 2 through 25 during a multiply operation. For this purpose, FIGS. 38 and 39 are helpful and will be referred to to indicate the data or the control action at the locations indicated. FIGS. 38 and 39 show the condition of carry save adders 68 through 70, indicated on the table as CSA1, CSA2 and CSA3 respectively. In FIGS. 38 and 39, the column labeled "Group" uses numbers 1 through 3 to designate which one of the respective multiplier multiples decoders 38, 39 and 40 are referred to. The column entitled "Reference" employs the numbers 1, 4 and 7 to indicate which position or order of the adder stages indicated at the top of FIG. 38 is the lowest order entry position of the selected multiple. The column labeled "Times" has numbers therein which indicate the multiples of the multiplicand which is selected by decoding the multiplier, and the column labeled "T/C" indicates whether the selected multiple is in true or in complement form. The column labeled "From" indicates which group of the multiplier multiples decoder the multiple is taken from. The column labeled "Adder" indicates the carry save adder involved. The column labeled "input" uses the letters A, B and C to indicate arbitrarily the three sets of input lines to the carry save adders 1 through 3. For purposes of illustration, let it be assumed that the multiplier is the binary number 111 111 001 101 000 001, that the multiplicand is the binary number 11 001 001 and that three times multiplicand is the binary number 1 001 011 011. During the first step the foregoing multiplier is stored in the multiplier register 28, the multiplicand is stored in the multiplicand register 10 and the three times multiplicand is stored in the $3 \times$ MCD register 14. In step 2, the output of CSA1, 2 and 3 is shown for the respective multiples of 1, 0 and 3 respectively. However, it may be convenient at this point to describe the inputs A, B and C in more detail. The input $A_1$ for carry save adder 1 in step 2 is representative of signals on the lines 350–359 which are applied from the high ten order stages of the sum register 76 to adders 221 through 230 of $CSA_1$. The inputs of $A_2$ and $A_3$ to respective carry save adders 2 and 3 comprise the sum output lines of the respective carry save adders 1 and 2. For example, the input $A_2$ to the carry save adder 2 in FIGS. 11 and 12 is represented by signals on the sum lines 221*a* through 239*a* from the carry save adder 1 in FIGS. 6 and 7. The inputs $B_1$ to carry save adder 1 for step 2 is taken from output lines 430 through 439 from the carry register 78 in FIGS. 24 and 25. The inputs $B_2$ and $B_3$ to respective carry save adders 2 and 3 are the carry output lines from respective carry save adders 1 and 2. For example, the $B_2$ input to carry save adder 2 is represented by signals on the output lines 221*b* through 229*b* from carry save adder 1 in FIG.

7. The inputs $C_1$ through $C_3$ to respective carry save adders 1 through 3 are the multiples from respective multiplicand multiples generators 38, 39 and 40, and these multiplicand multiples generators are designated by group numbers 1 through 3.

Returning to FIGS. 38 and 39, step 2 illustrates the outputs from the respective carry save adders CSA1, 2 and 3. In Step 3, the results of the first partial product are stored in the sum and carry registers indicated as A-Reg and R-Reg respectively, and the lower nine order sum and carry bits are stored in the multiplier register. Step 3 further illustrates the second partial product summation which is accumulated in the sum and carry registers. In step 4, the next nine low order bits of sum and carry are inserted in the multiplier register 28. The generation of the eight high bits of sum and carry is shown as step 5 together with the final sum and carry signals applied to the carry propagate adder are shown in step 5, the last line on the drawing indicating the final product.

The foregoing arrangement for performing multiply operations has been considered in terms of decoding three bits of the multiplier in a given decoder and using as many such decoders, for example, three as illustrated, as required in order to reduce the time of multiplication to a given length of time. However, the same concept may be applied to a technique for multiply using two bit groups instead of three, and as many decoders may be employed as are necessary to perform multiplication in a given length of time. Thus, for example, decoding eight bits simultaneously would require four decoders, 10 bits five decoders, and so forth. The technique required to handle two bits of the multiplier at a time requires being able to obtain the one times multiplicand in true or complement form and the two times multiplicand. Since no three times multiplicand is required, neither the manner of generating this multiple nor the facilities for storing it need be provided. The development of the decoding rules for this method follows the same basic requirements already described for handling three bit groups. The decoding for two bit groups is indicated in Table 2 below.

*Table 2*

| Multiplier Bits | Multiplicand Multiple Combinations Last Cycle Add | Multiplicand Multiple Combinations Last Cycle Subtract |
| --- | --- | --- |
| 00 | Bypass (+) | Add 1× MCD. |
| 01 | Add 1× MCD | Add 2× MCD. |
| 10 | Add 2× MCD | Subtract 1× MCD. |
| 11 | Subtract 1× MCD | Bypass (−). |

The multiples for 00, 01 and 10 in the above table are obvious since they follow strict binary notation, while the 11 multiple, which subtracts 1× MCD, is compensated for in the following cycle in the same manner as the 5 and 7 times in the three bit embodiment. For example, assume the last four multiplier bits are 0011. The 11, when decoded, causes 1× MCD to be subtracted. The 00, where the last cycle is subtract, adds 1× MCD. However, this add 1× MCD, since it relates to the two bits above the bits causing the subtract operation, effectively adds 4× MCD. Thus the 11 multiple, which identifies 3× MCD, is generated by subtracting 1 and adding 4 on the next operation. The other modifications required to adapt to the two bit technique appear obvious. The relative speed and equipment required for the two bit arrangement would depend on the time allotted for multiplication. Using the same number of carry save adders, the multiply operation speed would be about one-third slower but would be somewhat cheaper to impliment. The usual design consideration of speed vs. hardware would ultimately determine which method to employ.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for deriving the product of two binary numbers comprising in combination register means to store signals representative of a multiplier, register means to store signals representative of a multiplicand and register means to store signals representative of a selected multiple of said multiplicand, a plurality of multiplier multiples decoders, means coupling each of said decoders to consecutive groups of stages of said multiplier register, a plurality of multiplicand multiples generators coupled to said multiplier decoders for generating selected multiples of said multiplicand in accordance with the output from its associated decoder, a plurality of adder circuits connected in tandem configuration, each of said adders having as one input the selected multiplicand multiple, said adders being connected to provide a partial product on each add operation and means to combine said partial products to provide a final product.

2. Apparatus for deriving the product of two binary numbers including means to store signals representative of a multiplicand, means to store signals representative of a selected multiple of said multiplicand, means to store signals representative of a multiplier, means coupled to the means for storing signals representative of the multiplier for decoding signals in groups of consecutive digits starting at a radix point and containing equal numbers of signals in each group, said decoding means operating in response to signals representative of the value of said groups and to signals identifying the immediately preceding add or subtract operation to determine the numerical value of the group and whether said numerical value is in true or complement form, multiple generation means coupled to the means for storing signals representative of said multiplicand and said selected multiple of said multiplicand for generating signals representative of selected multiples of the multiplicand, said decoding means being coupled to said multiple generation means for using the value obtained by decoding each group to select a corresponding multiple of the multiplicand in said multiple generation means and means coupled to said multiple generation means for causing the selected value of said multiple of the multiplicand to be added if the decoded value is in true form and to be subtracted if it is in complement form.

3. A device of the character claimed in claim 2 wherein said multiplicand generation means is adapted to generate multiples of one, two, three, four and six times said multiplicand.

4. A device of the character claimed in claim 2 wherein multiples of five and seven times said multiplicand require a subtract operation followed by an add operation.

5. A binary multiplier for operating simultaneously on groups of multiplier digits to derive the product of a pair of operands comprising in combination
means for storing signals representative of a multiplier, a multiplicand and a multiple of said multiplicand,
means for simultaneously decoding groups of consecutive multiplier digits to define multiples of said multiplicand for each of said groups,
multiplicand multiple generation means coupled to said decoding means for generating said defined multiplicand multiples.
a plurality of adder circuits
said adder circuits being coupled to associated multiple generation means,
said adder circuits being connected in tandem configuration to provide when actuated a partial product accumulation corresponding to the sum of said selected multiplicand multiples specified by said means for decoding and means for combining the partial products thus derived to provide the resultant product of said multiplier and said multiplicand.

6. A device of the character claimed in claim 5 wherein certain of said multiplicand multiples may be generated in true or complement form.

7. A device of the character claimed in claim 5 including means responsive to certain selected multiples of said multiplicand for modifying the adjacent group of digits.

8. A binary multiplier for operating simultaneously on groups of multiplier digits to derive the product of a pair of operands comprising in combination means for storing signals representative of a multiplier, a multiplicand and a multiple of said multiplicand, means for decoding groups of consecutive multiplier digits to define multiples of said multiplicand for each of said groups, multiplicand multiple generation means coupled to said decoding means, said decoding means modifying said multiplicand or said multiple of said multiplicand to generate the appropriate multiplicand multiple defined by said decoding means, a plurality of adder circuits, said adder circuits being coupled to associated multiple generation means, said adder circuits being connected in tandem configuration to provide when actuated a partial product accumulation corresponding to the sum of said selected multiplicand multiples specified by said means for decoding and means for combining the partial products thus derived to provide the resultant product of said multiplier and said multiplicand.

9. A binary multiplier comprising a first register having a plurality of stages for storing signals representative of a multiplicand, a second register for storing signals representative of a multiple of said multiplicand, a third register having a plurality of stages for storing signals representative of a multiplier, a fourth register having a plurality of stages for storing signals representative of a partial product, a plurality of adder circuits connected in cascade arrangement, the output of said cascaded adder circuits being connected to said fourth register, a plurality of decoders coupled to said third register for decoding groups of signals from said third register, each of said groups comprising a number of adjacent binary digits a plurality of multiplicand multiples generators, each of said generators being coupled to said first register and second register and to the output from an associated decoder, said multiplicand multiples generator being responsive to the output from said associated decoder to generate the multiple of said multiplicand defined by said decoder, means coupling the output from each of said multiplicand multiples generator to an associated one of said adders, means responsive to a control signal for accumulating the contents of said plurality of adders to form a partial product and means for transferring each partial product thus generated to an output device for later consolidation into a final product.

10. A device of the character claimed in claim 9 wherein said third register is a shift register for transferring said groups of binary digits to their associated decoder.

11. A device of the character claimed in claim 9 wherein the low order portion of said partial product stored in said fourth register is connected to the input of said cascaded connected adders.

12. A device of the character defined in claim 9 wherein said multiplicand multiples generators, in generating certain multiplicand multiples, subtract said multiplicand or said multiple stored in said first or second register and augment the adjacent higher group of digits.

13. A device of the character claimed in claim 12 wherein the 7× multiple of the multiplicand is generated by complementing the contents of said first register and augmenting the lowest order bit of the adjacent group.

14. A device of the character claimed in claim 12 wherein the 5× multiple of the multiplicand is generated by complementing the contents of said second register and augmenting the lowest order bit of the adjacent group.

15. A binary multiplier comprising in combination a first register for storing signals representative of a multiplier, means for transferring groups of consecutive digits in said first register to a plurality of decoders, each of said groups comprising three consecutive digits, second and third registers for storing signals representative of a multiplicand and a selected multiple of said multiplicand respectively, a plurality of adders connected in a matrix configuration, said adder configuration having an input and output and the individual adders within said configuration having an input and output, a plurality of multiplicand multiples generators, means coupling said second and third registers to said generators, said generators being responsive to generate the multiplicand multiple defined by the associated decoder, means coupling the output of said multiplicand multiples generators to an associated adder stage and means response to a control signal for accumulating the contents of said adders to provide the first partial product and means for generating successive partial products until a final product is provided.

References Cited in the file of this patent

UNITED STATES PATENTS

| | | |
|---|---|---|
| 2,641,407 | Dickinson | June 9, 1953 |
| 2,693,903 | Tootill | Nov. 9, 1954 |
| 2,765,115 | Beloungie | Oct. 26, 1956 |
| 2,856,126 | Kilburn | Oct. 14, 1958 |
| 2,924,383 | Weiss | Feb. 9, 1960 |
| 3,016,195 | Hamburgen | Jan. 9, 1962 |

UNITED STATES PATENT OFFICE
CERTIFICATE OF CORRECTION

Patent No. 3,115,574                      December 24, 1963

Gerard T. Paul et al.

It is hereby certified that error appears in the above numbered patent requiring correction and that the said Letters Patent should read as corrected below.

Column 8, line 39, for "singal" read -- signal --; column 8, line 52, for "the" read -- this --; column 11, line 71, for "multiplicant" read -- multiplicand --; column 15, line 49, after "previously" strike out the comma; column 19, line 66, after "operation" insert a comma; column 22, line 17, after "multiplier" insert -- multiplies --; column 22, line 69, for "multiples." read -- multiples, --; column 23, line 53, after "digits" insert a comma.

Signed and sealed this 29th day of December 1964.

(SEAL)
Attest:

ERNEST W. SWIDER                      EDWARD J. BRENNER
Attesting Officer                      Commissioner of Patents